United States Patent
Ausserlechner

(10) Patent No.: US 10,175,062 B2
(45) Date of Patent: Jan. 8, 2019

(54) OUT OF SHAFT MAGNETIC ANGLE SENSING SYSTEM

(71) Applicant: InfineonTechnologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 13 days.

(21) Appl. No.: 15/001,519

(22) Filed: Jan. 20, 2016

(65) Prior Publication Data

US 2016/0216132 A1 Jul. 28, 2016

Related U.S. Application Data

(60) Provisional application No. 62/107,301, filed on Jan. 23, 2015.

(51) Int. Cl.
| | | |
|---|---|---|
| G01B 7/30 | (2006.01) | |
| G01D 5/14 | (2006.01) | |
| G01D 5/12 | (2006.01) | |
| G04C 5/00 | (2006.01) | |
| H02K 49/10 | (2006.01) | |

(52) U.S. Cl.
CPC .............. G01D 5/14 (2013.01); G01D 5/12 (2013.01); G01D 5/142 (2013.01); G01D 5/145 (2013.01); *G04C 5/00* (2013.01); *H02K 49/102* (2013.01)

(58) Field of Classification Search
CPC ........ G04C 5/00; H02K 49/102; G01D 5/142; G01D 5/145; G01D 5/2033; G01D 5/2241

USPC ................... 324/51, 55, 200, 207.11, 207.25
See application file for complete search history.

(56) References Cited

U.S. PATENT DOCUMENTS

| | | | |
|---|---|---|---|
| 4,570,118 A | 2/1986 | Tomczak et al. | |
| 5,757,179 A | 5/1998 | McCurley et al. | |
| 5,982,170 A | 11/1999 | McCurley et al. | |
| 6,483,296 B1 * | 11/2002 | Hamaoka ............... | G01D 5/145 324/207.2 |
| 6,489,761 B1 | 12/2002 | Schroeder et al. | |
| 8,552,714 B2 | 10/2013 | Matsushima et al. | |
| 2002/0135497 A1 * | 9/2002 | Kimura .................. | G01D 5/145 340/870.31 |
| 2005/0046418 A1 * | 3/2005 | Fukaya .................. | G01D 5/145 324/207.25 |
| 2005/0253578 A1 * | 11/2005 | Kawashima ....... | G01D 5/24419 324/207.25 |

(Continued)

FOREIGN PATENT DOCUMENTS

| | | |
|---|---|---|
| JP | S56-061104 A | 5/1981 |
| JP | 2010-197373 A | 9/2010 |
| JP | 2010-249670 A | 11/2010 |

OTHER PUBLICATIONS

Office Action dated Jul. 30, 2018 for Korean Patent Application No. 10-2017-7023195.

*Primary Examiner* — Huy Q Phan
*Assistant Examiner* — Raul Rios Russo
(74) *Attorney, Agent, or Firm* — Schiff Hardin LLP

(57) ABSTRACT

In a magnet assembly, and an angle detection system embodying such a magnet assembly, for detecting a rotational angle of a rotating shaft, first and second magnet portions are mounted on the shaft, and have geometrical shapes and respective magnetizations with various symmetry features.

32 Claims, 21 Drawing Sheets

(56) References Cited

U.S. PATENT DOCUMENTS

| | | | |
|---|---|---|---|
| 2009/0033315 A1* | 2/2009 | Kawashima | G01D 5/145 324/207.2 |
| 2009/0295238 A1* | 12/2009 | Yasuda | H02K 21/44 310/49.07 |
| 2011/0175601 A1* | 7/2011 | Bogos | G01D 5/14 324/207.25 |
| 2013/0015844 A1* | 1/2013 | Bogos | G01D 5/24452 324/207.2 |
| 2014/0252902 A1* | 9/2014 | Binkowski | H02K 31/02 310/156.08 |
| 2015/0022186 A1* | 1/2015 | Ausserlechner | G01D 5/145 324/207.2 |
| 2015/0137796 A1* | 5/2015 | Ausserlechner | G01B 7/30 324/207.2 |
| 2015/0142376 A1* | 5/2015 | Ausserlechner | G01D 5/145 702/151 |
| 2015/0253154 A1* | 9/2015 | Dickinson | G01R 33/07 324/207.25 |
| 2016/0069710 A1* | 3/2016 | Ausserlechner | G01D 5/2454 324/207.23 |

\* cited by examiner

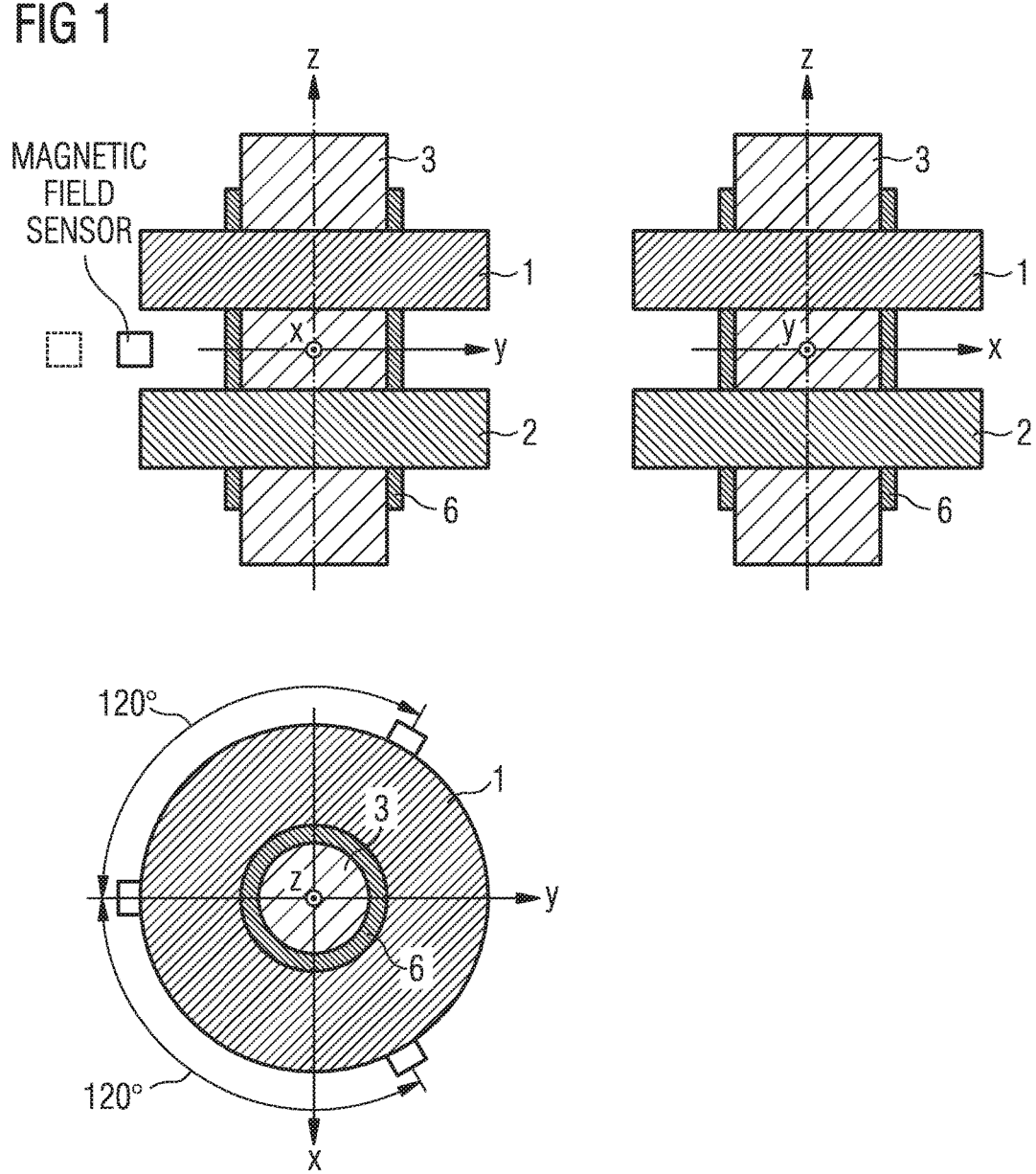

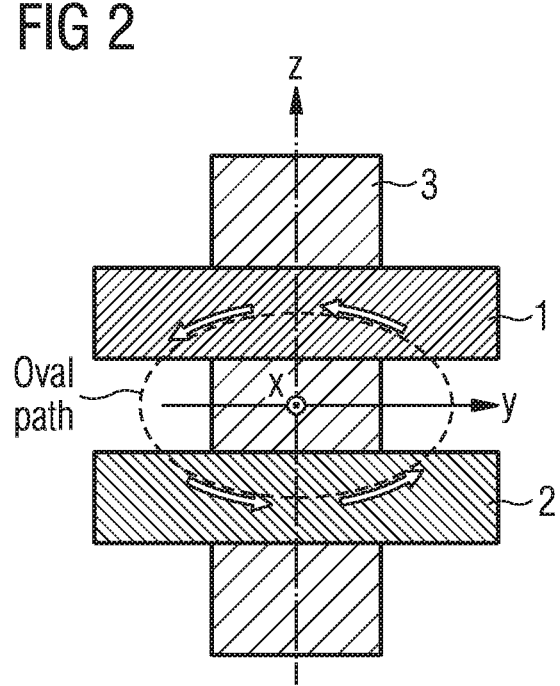

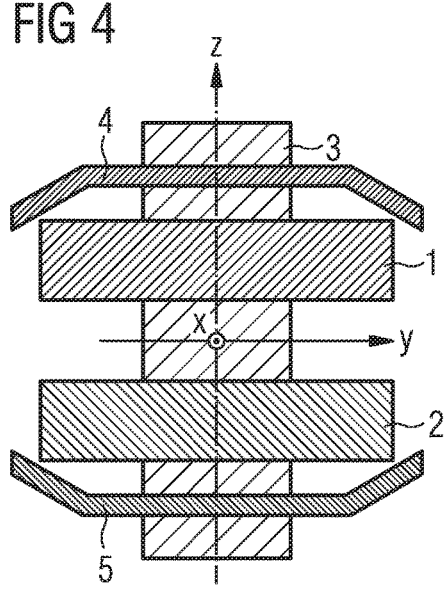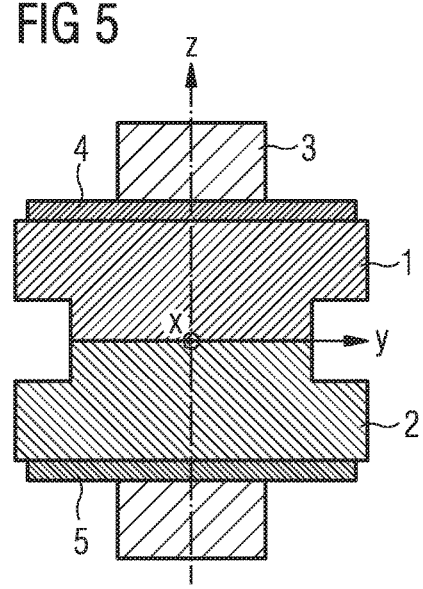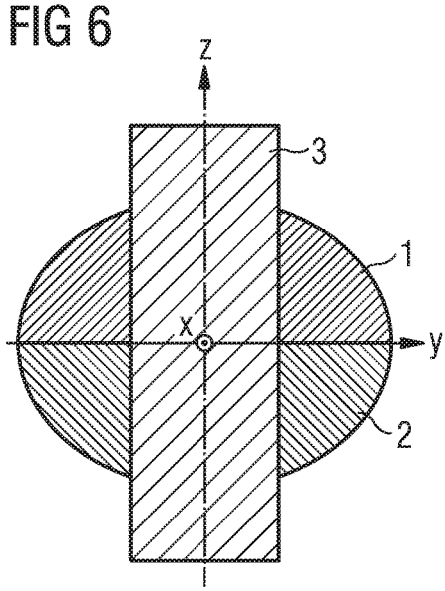

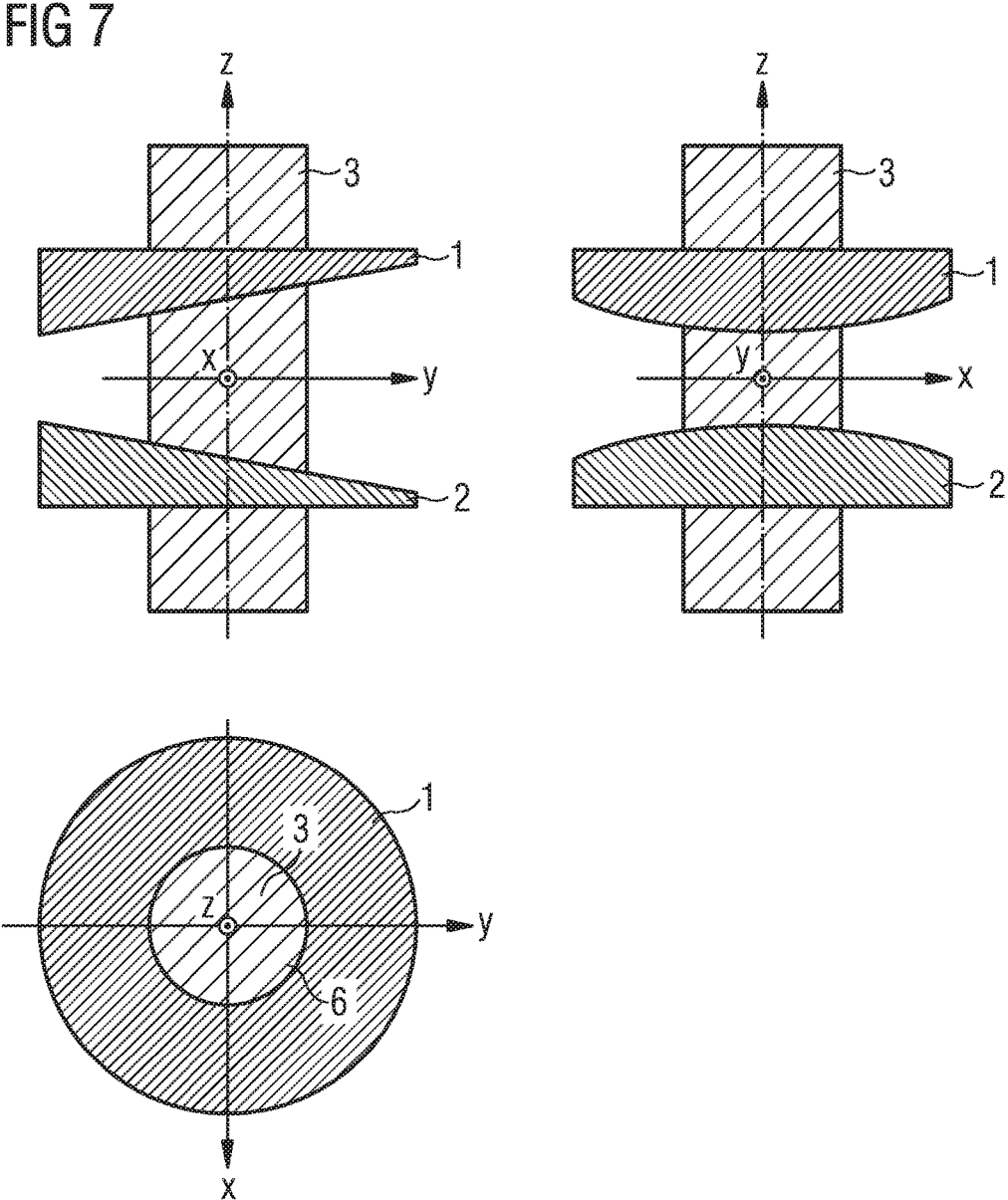

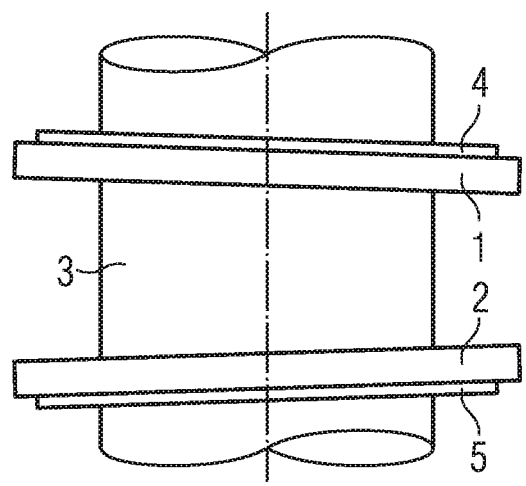
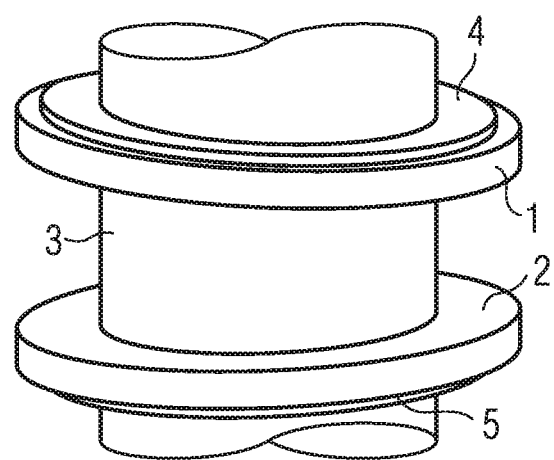

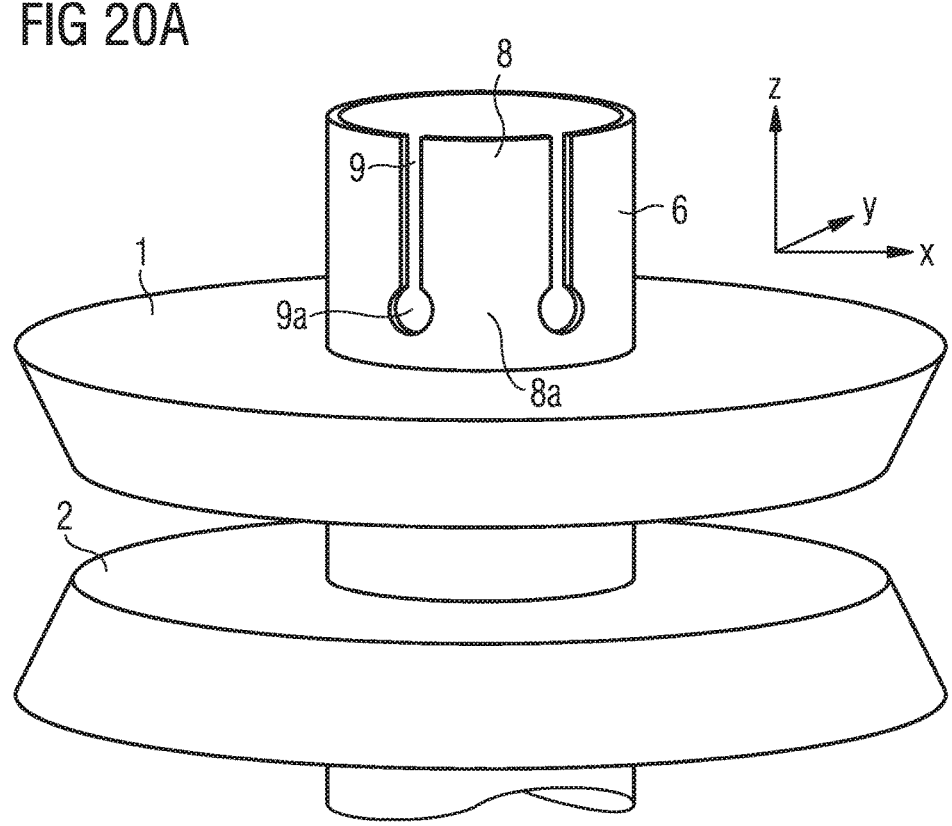

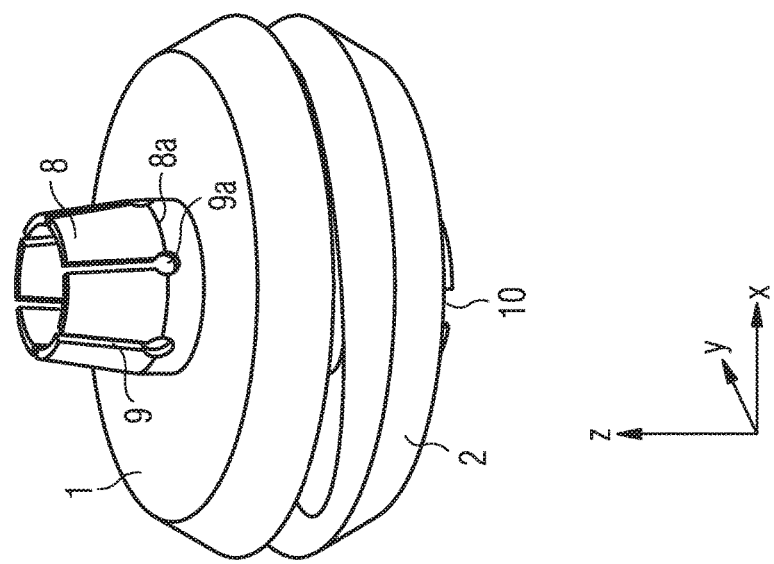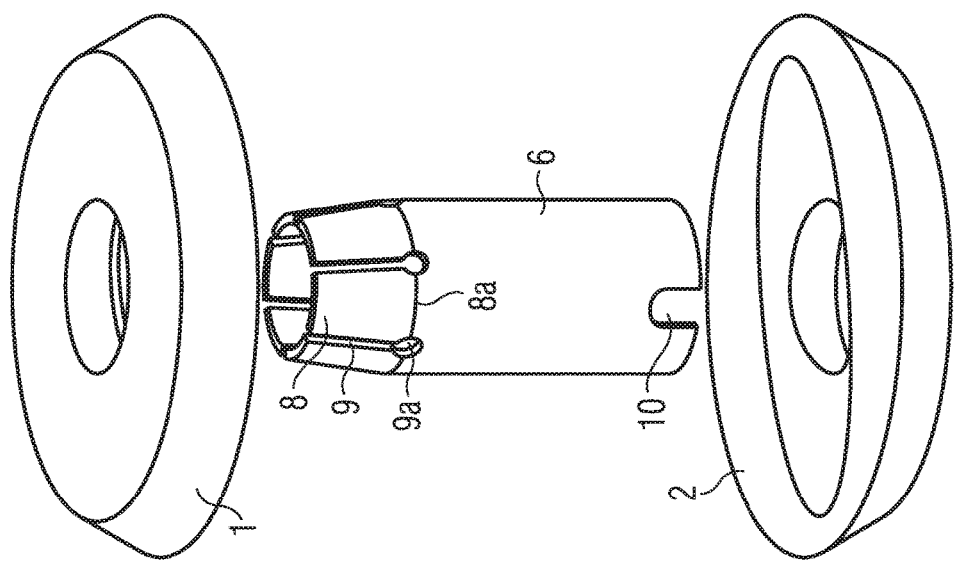
FIG 20B

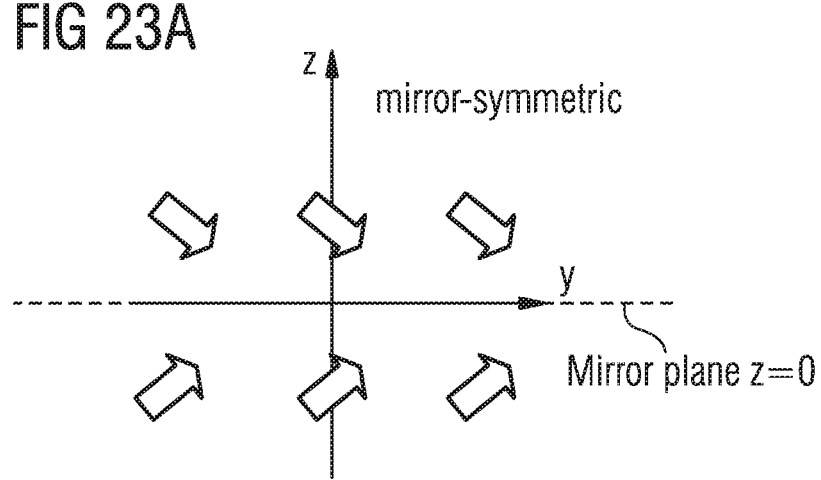
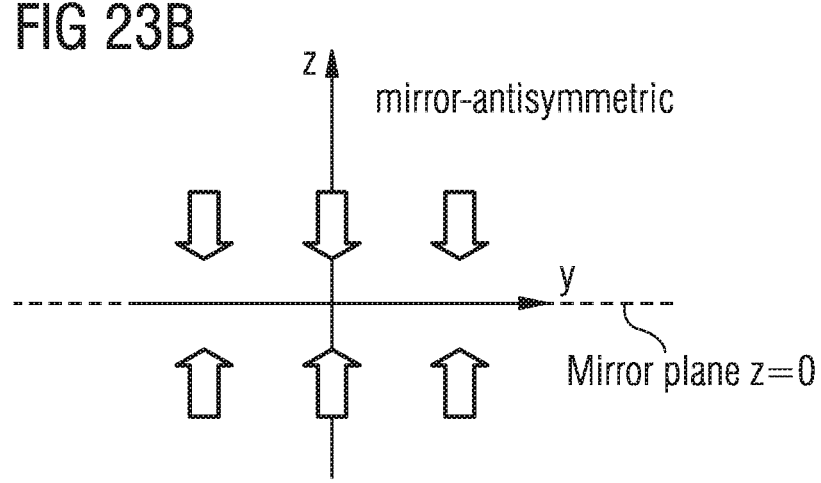
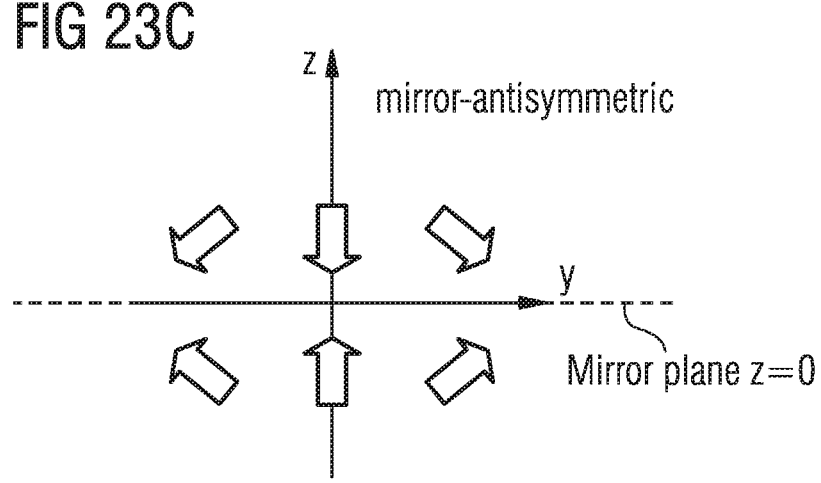

OUT OF SHAFT MAGNETIC ANGLE SENSING SYSTEM

BACKGROUND

In many applications it is desired to monitor the rotation of a shaft or an axle around the longitudinal axis of the shaft or axle, by detecting the angle of rotation. It is known to detect the angle of rotation using a magnet assembly that is fixed to the shaft or axle, so as to co-rotate therewith. Such a magnet assembly produces a magnetic field that rotates along a circle that is concentric with the axis of rotation of the shaft or axle. To detect an angle of rotation, known angle sensors measure magnetic field components (e.g. x-y-component) and compare the measured magnetic field components to provide a value of the rotation angle, typically by using geometrical functions of the ratio of the two components. Thus, an angle sensor system is capable to uniquely determine the rotation angle (between 0 and 360°) at each rotation angle position of the axis from the at least two magnetic field components distinguished for example from speed sensors utilizing for example pole wheels who are capable of determining only increments of fractional angle amounts.

In an on-axis angle detection system, a non-rotationally symmetric button magnet may be placed at the end of the shaft. Magnetic sensors placed near the axis of rotation may be used to detect an angle of rotation.

For some applications, however, this known arrangement is not suitable, usually because of space limitations or other factors in the environment of the rotating shaft. Then, one or more field detectors may be situated around the rotating shaft or axle on or within a so-called reading radius (reading circle), in order to detect the magnetic field of the rotating magnet assembly, and thus to identify the magnitude of the rotating magnetic field at the detection locations. Such an angle sensor is known as an "off-axis" angle sensor, or an out of shaft angle sensor, because the sensor elements are not situated on the rotation axis of the shaft or axle.

In both types of angle sensing systems, Hall probes or magneto-resistive (MR) sensors may be used in order to detect the magnetic field and its orientation. Examples of such sensors are described in U.S. Pat. No. 8,779,760.

In general, known off-axis angle detection systems are not as precise as known on-axis systems. It is typical for an on-axis system to be able to detect the angle with an error of less than 1°, whereas known off-axis systems typically have a detection error of approximately 5°. A primary reason for the lower precision of off-axis systems is the sensitivity of such systems to manufacturing tolerances.

Such manufacturing tolerances include geometric tolerances, such as the positional error of the magnet on the shaft, as well as the respective positions of the sensor elements of the read circuit, both with respect to radial position and tilting of the shaft or axle. Errors that are inherent in the sensor elements themselves, such as zeroing (calibration) errors, gain and linearity errors may also contribute to the lower precision, as well as an inability to precisely match the sensitivities of individual sensors to each other, when multiple sensors are used in a sensing arrangement.

SUMMARY

According to one aspect, embodiments herein provide a magnet assembly for use in determining a rotational angle of a rotatable shaft, wherein the magnet assembly has a first magnet portion configured to be mounted on the shaft, for co-rotation with the shaft around an axis of rotation and a second magnet portion configured to be mounted on the shaft, for co-rotation with the shaft around the axis of rotation. The first and second magnet portions have respective geometrical configurations such that a radial recess is formed between the first and second magnet portions. The first and second magnet portions are geometrically arranged to be mirror-symmetrical with respect to a plane that is oriented perpendicular to the axis of rotation According to a further aspect, embodiments herein provide a magnet assembly for use in magnetic angle detecting system to determine a rotational angle of a rotatable shaft around an axis of rotation, the magnet assembly having a first magnet portion configured to be mounted on the shaft, for co-rotation with the shaft, and a second magnet portion configured to be mounted on the shaft, for co-rotation with the shaft. A mounting structure is provided to mount the first and second magnet portions on a rotatable shaft. The first and second magnet portions are mounted on the mounting structure such that a magnetic field is cooperatively produced, wherein, at least at positions along a circle concentric with the axis of rotation, the produced magnetic field is mirror-symmetrical or mirror-antisymmetrical with respect to a plane oriented perpendicularly to the axis of rotation of the shaft.

According to a further aspect, a magnet assembly for use in determining a rotational angle of a shaft which is rotatable around a rotation axis has a first magnet portion configured to be mounted on the shaft, for co-rotation with the shaft, and a second magnet portion configured to be mounted on the shaft, for co-rotation with the shaft. The first magnet portion has a first magnetic charge distribution and the second magnet portion has a second magnetic charge distribution, wherein a magnetic surface charge is inhomogeneously distributed along a rotation axis direction and wherein, when mirrored at a mirror plane perpendicular to the rotation axis, each point in the first magnetic charge distribution has a corresponding point in the second magnetic charge distribution, whereby a magnitude of magnetic charge in corresponding points is identical.

According to a further aspect, a system includes a shaft arranged to be rotatable around an axis of rotation, a magnet assembly with first and second magnet portions mounted on the shaft, for co-rotation with the shaft around the axis of rotation and at least one sensor situated outside of the shaft in a plane perpendicular to the axis of rotation at a radial distance from the axis of rotation. The magnet assembly produces a magnetic field that is, along a reading circle, mirror-symmetrical or mirror-antisymmetrical with respect to the plane, wherein the reading circle is a circle within the plane, the reading circle being concentric with the axis of rotation and having a radius equal to the radial distance.

According to a further aspect, a method of manufacturing an out of axis angle sensor system includes mounting a first magnet portion and a second magnet portion on a sleeve. The first and second magnet portions are geometrically arranged to be mirror-symmetrical to a plane oriented perpendicular to the axis of rotation. The sleeve is mounted on a shaft for co-rotation with the shaft and at least one magnetic sensor is mounted at a position radial to the shaft.

According to a further aspect, a device for use in an absolute rotational angle sensor system comprises a magnet portion to co-rotate with a shaft around an axis of rotation, the magnet portion comprising a varying thickness, the thickness taken in a direction parallel to the axis of rotation. The magnet portion comprises a minimum thickness at a first position and at a second position, wherein the first and second positions are diametrically arranged.

BRIEF DESCRIPTION OF THE DRAWINGS

FIG. 1 shows elevation and plan views of a first embodiment of an angle sensor in accordance with embodiments.

FIG. 2 is an elevation view of a second embodiment of a magnet assembly for an angle sensor in accordance with embodiments.

FIG. 4 is an elevation view of a fourth embodiment of a magnet assembly for an angle sensor in accordance with embodiments.

FIG. 5 is an elevation view of a fifth embodiment of a magnet assembly for an angle sensor in accordance with embodiments.

FIG. 6 is an elevation sectional view of a sixth embodiment of a magnet assembly for an angle sensor in accordance with embodiments.

FIG. 7 shows elevation and plan views of a seventh embodiment of an angle sensor in accordance with embodiments.

FIG. 10 is an elevational view of a further embodiment of the magnet assembly in accordance to embodiments.

FIG. 11 is a perspective view of the embodiment of the FIG. 10.

FIGS. 20A, 20B, 20C and 20D show a perspective view according to embodiments.

FIGS. 23A, 23B and 23C show examples of a mirror-symmetrical vector field.

DETAILED DESCRIPTION

Figure 3A:
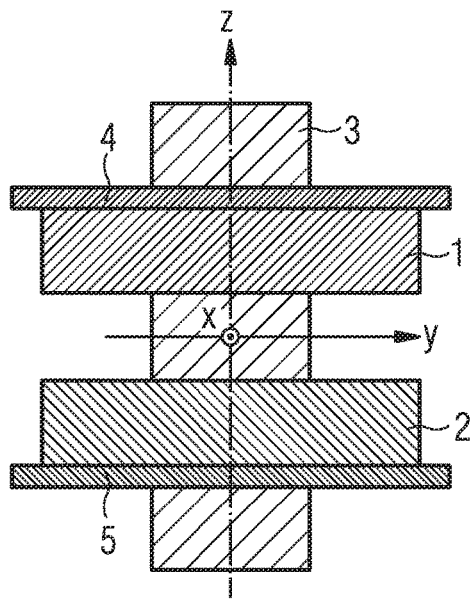
FIGS. 3a, 3b and 3c respectively show different elevation versions of a third embodiment of the magnet assembly for an angle sensor in accordance with embodiments.

Embodiments described herein concern off-axis angle sensor arrangements. As used herein, embodiments of such an arrangement may include a magnet assembly having a central bore, which may be used to accommodate a shaft, with sensor elements located at radial distances from the rotation axis, which are larger than the radius of the bore. The off axis sensor arrangement is an absolute angle sensor system and is therefore capable to uniquely and continuously determine a rotation angle (e.g. between 0 and) 360° at each rotation angle position of the axis only from the momentary magnetic field, e.g. only from two sensed magnetic field components of the momentary magnetic field.

The embodiments of the method and system described herein address angle errors in off-axis angle sensing systems caused by manufacturing tolerances, geometrical mounting inaccuracies etc. To avoid such errors, embodiments described herein provide a magnet assembly and a more robust off-axis angle detection system using a magnet assembly that provides a magnetic field at the sensing location of the sensor elements which has a high degree of symmetry. A magnet assembly as described herein provides a high degree of symmetry. An off-axis angle sensor arrangement that uses magnetic fields generated by such a magnet assembly for detecting a rotation angle is more robust to manufacturing or mounting tolerances and leads to reduced angle errors. Distinguished from systems who measure a field gradient, embodiments herein determine a rotational position (angle of rotation) based on the measurement of at least one magnetic field component (e.g. Bz, BR, Bψ) at at least one sensing position. From this measured field component, the angle of rotation is determined. According to embodiments, a higher degree of symmetry and therefore a more robust system may be obtained if the magnetic field gradient of the measured magnetic field vector component (or components) is zero at the location of the respective sensor. This may for example include that at least the magnetic field gradient of first order with respect to one or more of the aforementioned vector components vanishes, i.e. will be 0, or as close to 0 as is practical. In some embodiments, some gradients of the magnetic field components vanish in a plane of mirror symmetry or mirror-antisymmetry. Gradients which vanish in a plane of mirror symmetry or mirror antisymmetry can be advantageous for providing robustness against small placement tolerances.

Furthermore, in some embodiments, the magnetic field at the location of the sensor elements is parallel to the axis of rotation (and not for example orthogonal to the axis of rotation) while the shaft and the magnet assembly attached to the shaft rotates around the axis of rotation. Since the magnetic field at the sensor elements is for all rotational positions always in a direction parallel to the axis of rotation, robustness against small tilts and misalignment of all parts is increased compared for example to systems with a magnetic field orthogonal to the axis of rotation at the location of the sensor element.

The coordinate system in which the vectors are designated can be a Cartesian coordinate system or a cylindrical coordinate system.

In accordance with embodiments, in a magnetic angle sensor system having a magnet assembly that co-rotates with a rotating shaft, the magnetization of the magnet assembly, and the position of at least one sensor element, are designed so that the gradient of at least one component of the magnetic field goes to 0, and in some embodiments the gradients of two components of the magnetic field go to 0, at the location of the sensor and for all rotational positions of the shaft. Moreover, the magnet assembly in accordance with embodiments generates a magnetic field on the reading circle, which has only one or two perpendicular components, and thus at least a third spatial component must vanish (go to zero or as close to zero as practically possible). Preferably, the magnet assembly has only a single magnetic field component. Such a single magnetic field comment may be the z-component (i.e., parallel to the rotation axis).

In magnetic field theory, it is known that a magnetic field assigns a magnetic vector to each point in space. The magnetic vector can be decomposed for each point in space into a vector with three orthogonal vector components in Cartesian space. The total field is a superimposition of the three Cartesian components x, y and z for all points in space. Thus, a magnetic field can be represented as $Bx(x, y, z)$, $By(x, y, z)$, $Bz(x,y,z)$, where $Bx$, $By$, $Bz$ are the Cartesian magnetic field components and $(x,y,z)$ represents the coordinates of the point in space to which the magnetic vector is assigned to. The same is true with regard to a cylindrical coordinate system, wherein the components are R, $\psi$ (Psi) and z, wherein R designates the radial direction, $\psi$ is the tangential or azimuthal direction, and z is the axial direction. As with the Cartesian Coordinate system, the radial direction R, the tangential or azimuthal direction $\psi$ and the axial direction z are orthogonal directions. Thus, in a cylindrical coordinate system, a magnetic field can be represented as $BR(R, \psi, z)$, $B\psi (R, \psi, z)$, $Bz (R, \psi, z)$ where $BR$, $B\psi$, $Bz$ are the cylindrical magnetic field components and $(R, \psi, z)$ is the cylindrical representation of the point in space to which the magnetic vector is assigned to, Also a mixed form of representation can sometimes be considered, for example a representation of the magnetic field components in cylindrical coordinates and the points in space in Cartesian coordinates.

In accordance with embodiments, the readout sensor or sensors is/are located in a plane that is perpendicular to the axis of rotation of the shaft end magnet assembly. As an example, this plane can be designated as the z=0 plane.

The magnet assembly will then be formed by a first magnet portion in a first half-space z>0, and a second magnet portion in a second half-space z<0. Furthermore, the geometry of the second magnet portion of the magnet assembly mirrors the first magnet portion with respect to the z=0 plane. The magnet assembly thus is composed of two magnet portions 1 and 2 that are arranged on a rotating shaft 3 mirror-symmetrically to the plane in which the readout sensor (reading radius) is located. Each of the magnet portions 1 and 2 may be formed by a body comprising hard-magnetic material. The body forming a respective magnet portion may be a solid body having a bore to allow mounting on a rotating shaft. The body may be also be formed by joining two or more previously separated sections of the body.

In embodiments, a radial recess is formed between the first and second magnet portions 1 and 2 in the plane of symmetry. The radial recess extends within the plane of symmetry radial inwards towards the axis of rotation. The first and second magnet portions 1 and 2 may therefore be symmetric to the recess. The radial recess allows producing strong and homogenous magnetic fields with a high degree of symmetry at the locations of the sensors. The recess thus enhances robustness against positional mounting errors and other errors. The radial recess between the first and second magnet portions 1 and 2 circulates around the axis of rotation. The recess may in some embodiments be a gap between the first and second magnet portions 1 and 2 which extends in radial direction from the outer face of the first and second magnet portions 1 and 2 inwards to the shaft or to a mounting structure. In some embodiments, the recess may extend in radial direction from the outer face to the shaft or the mounting structure only partially.

The above discussion so far accounts only for the geometry of the magnet assembly. In addition, the magnetization of the magnet assembly is addressed in the following.

The discussion herein is based on the commonly understood distinctions between hard magnetic material and soft magnetic material. Hard magnetic material is used to form a permanent magnet, and retains its magnetization even in the absence of an externally applied magnetic field. Soft magnetic material is easy to magnetize and demagnetize by applied fields. Soft magnetic material has a relative permeability that is much greater than 1.

For permanent magnets, the discussion herein applies directly, but for soft magnetic portions the discussion applies only to the extent that the magnetization thereof is retained. In practice, there may be an array of permanent magnetic and soft magnetic portions. For the soft magnetic portions, only the geometric symmetry conditions apply, but geometric and magnetic symmetry conditions apply to permanent magnetic portions.

In magnetic charge theory, the magnetic field of a permanent magnet can be considered as being produced by fictitious magnetic charges (the N and S poles), that are distributed on the surface of the permanent magnet, and occasionally may be considered as being in the interior of the permanent magnet. As noted, these are fictitious charges that do not exist physically, but can be used to calculate static magnetic fields with precision. The scalar product of the magnetization vector and the unit vector oriented outwardly with respect to the surface of the permanent magnet is identical with the effective surface magnetic charges, i.e. the magnetic charge per unit surface area. Herein, the symmetry conditions in accordance with embodiments can be discussed in the terms of the aforementioned magnetic charges, but can be shown in the drawings using magnetization vectors, and the above represents the link between these two items.

Figure 22A:
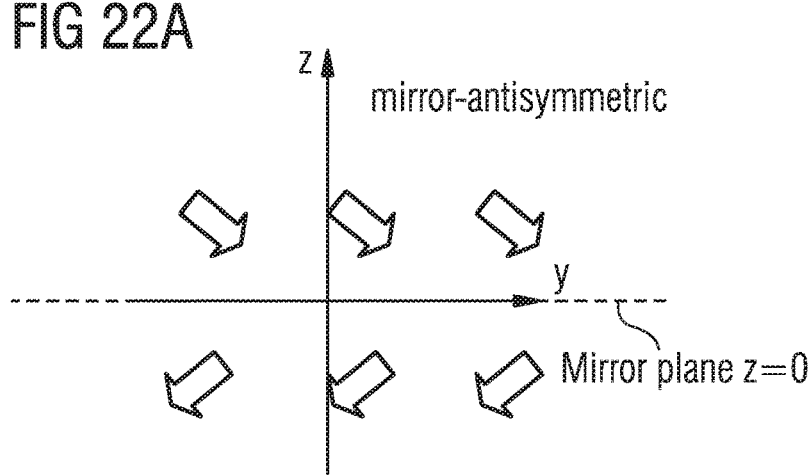
FIGS. 22A, 22B and 22C show examples of a mirror-antisymmetrical vector field.
Figure 22B:
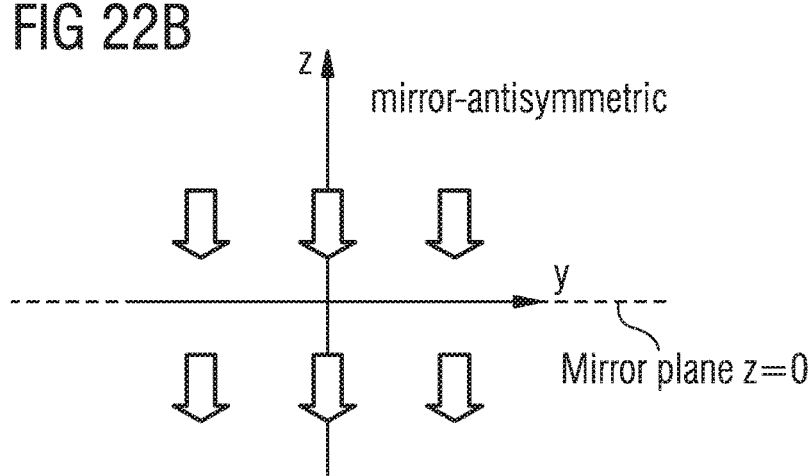
Figure 22C:
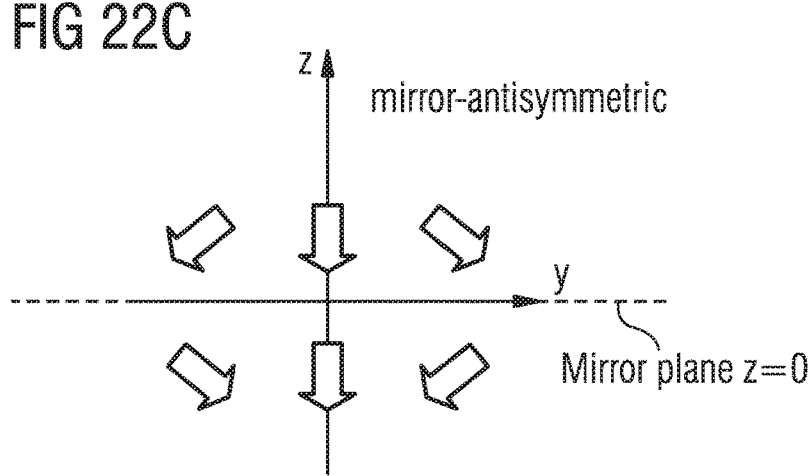

In addition to the aforementioned geometric mirror symmetry, the magnet assembly according to embodiments may be designed so that a magnetic charge on or in the first magnet portion of the magnet arrangement has the same magnitude, but an opposite polarity (opposite sign), with respect to a corresponding magnetic charge in the second magnet portion of the magnet assembly. Therefore, in such embodiments, if a north pole at one point of magnet is present, there must be an equally strong south pole at a site in the assembly, which is mirrored at the z=0 plane, i.e. at the twin point. This condition results in the aforementioned plane of symmetry z=0 for the readout circuit: (i) the magnetic field is perpendicular to the plane of symmetry and thus the magnetic field is parallel to the rotation axis during the entire 360° revolution of the magnet assembly around the rotation axis, and (ii) the gradient of the z-component of the magnetic field along z-direction vanishes in the plane of symmetry. Furthermore, when magnetic charges are arranged mirror-symmetrical with respect to a mirror plane and with same magnitudes but opposite polarity, the resulting magnetization and a magnetic field produced is anti-symmetrical. As used herein, a magnetization, magnetic field or more general a vector field is mirror-antisymmetrical with respect to a plane when vectors of the vector field that are respectively assigned to mirror-symmetrical points in space have a same magnitude with one of the corresponding vectors being a mirrored vector of the other with reversed direction. For better understanding, FIGS. 22A, 22B and 22C show some examples of mirror-antisymmetrical vector fields. FIGS. 22A, 22B and 22C show in an z-y plane projection vector fields which are antisymmetrical with respect to the z=0 mirror plane (the mirror plane is shown in FIGS. 22A, 22B and 22 C as dotted line). For the above described symmetries, within the plane of symmetry (here z=0 plane), only the z-component of the magnet field differs from 0, whereas components in R and ψ directions vanish (in a cylindrical coordinate system). This means that the sensor elements which are intended to be provided in the plane of symmetry must be able to detect the z-component. The above arrangement is very robust against positional tolerances as both magnetic components Br and Bψ vanish and therefore a high degree of symmetry exists.

In practical implementations, a first magnetic component may be considered vanishing with respect to a second magnetic component if the magnitude of the second magnetic component is at least a factor of 10 higher than a magnitude of the first magnetic component. Thus, for the above symmetry, the magnitude of Bz may be at least a factor of 10 higher than both magnitudes of BR and Bψ. It is further to be understood that with respect to magnetic fields described herein, symmetry considerations and resulting vanishing magnetic components or vanishing derivatives of magnetic components are at least to be considered valid in the vicinity of the reading circle which determines the magnetic field sensed by the sensors. In practical application, the magnetic field in regions at a distance from the reading circle may be weaker and may be prone to other magnetic influence for example due to ferromagnetic parts etc. Such effects may destroy the symmetry of a magnetic field at regions distant from the reading circle. Therefore, the symmetry considerations of magnetic fields as described herein are primarily intended to be valid for magnetic fields in the vicinity of the reading circle.

Another arrangement in accordance with embodiments is for a magnetic charge to be located at a point on or in the first magnet portion 1 of the magnet arrangement with a magnitude that is the same as a corresponding charge in a second magnet portion of the magnet assembly, with both charges having the same polarity. This means that for a north pole at one point on the magnet, there must be an equally strong north pole at a point that is mirrored at the plane z=0. This condition also results in the plane of symmetry z=0. In this embodiment, only the z-component of the magnetic field disappears, and the components in r and ψ directions are different from 0. Thus, the detector must be able to detect at least one of the r and ψ components. When magnetic charges are arranged mirror-symmetrical with respect to a plane with same magnitudes and same polarity, the resulting magnetization is mirror-symmetrical. As used herein, a magnetic field, a magnetization or more general a vector field that is mirror-symmetrical with respect to a plane is a vector field in which vectors of the vector field that are respectively assigned to mirror-symmetrical points in space have a same magnitude with one of the corresponding vectors being a mirrored vector of the other. For better understanding, FIGS. 23A, 23B and 23C show examples of vector fields projected into a y-z plane in which the vector fields are mirror-symmetrical with respect to the z=0 plane.

The magnetic field component (Bz for the mirror-anti-symmetric case; Br, Bψ for the mirror symmetric case) which is sensed by the sensor varies along the reading cycle dependent on the azimuthal angle. This variation of the sensed magnetic field component allows detecting an angle of rotation. When looking at variations of the sensing magnetic field component, the above conditions may therefore be formulated such that a variation of at least one magnetic field component is negligible compared to a variation of a respective sensed component of the magnetic field along the reading circle, In practical implementations a negligible variation of a magnetic field component may be present when the maximal variation (maximum value minus minimum value) of the sensed magnetic field component along the reading circle is at least a factor 10 higher than a maximal variation of the other magnetic field component along the reading circle.

In general, the degree of symmetry in the sense circuit and therefore the robustness against positional tolerances will be higher when two orthogonal components disappear, than if only one component disappears. This can be seen if a detector is considered that is slightly tilted relative to its nominal alignment due to unavoidable assembly tolerances. If the magnetic field at the sensor has only a single component, a small tilt of this direction will not lead to crosstalk with other magnetic field components, because they are not present. However, if the magnetic field has two or even three perpendicular components and only one of them would be detected in the ideal case without tilt, then a tilt will lead to crosstalk such that the other magnetic field components add contributions to the sensor signal and this generally leads to errors in the detection of the angle.

Furthermore, the produced varying magnetic field is in embodiments, at least along the reading circle (circle within the plane and concentric with the axis of rotation) and/or close to the reading circle, mirror-symmetrical or mirror-antisymmetrical with respect to a plane perpendicular to the axis of rotation. In embodiments, close to the reading circle may include regions co-centric with the axis of rotation wherein a maximal variation (maximum value minus minimum value) of the sensed magnetic field component along a circle is between 90 and 110 percent of the maximal variation along the reading circle. The maximal variation along a circle may also be referred as a hub along the circle.

The magnet assembly can be formed by permanent magnets, but may also include soft magnetic portions, but they must contain at least one permanent magnet, because an arrangement formed only by soft magnetic portions cannot generate a magnetic field.

For both of the above described cases (mirror symmetric and mirror-antisymmetric), the magnetic charge distribution of the first and second magnet portions can provide a magnetic surface charge of the magnet assembly which is inhomogeneously distributed along a rotation axis direction.

The magnet assembly does not necessarily have to be rotationally symmetrical. In some embodiments, the outer edge or perimeter of the magnet assembly is located at a constant distance from the rotation axis, but may have an angle-dependency in the axial direction (as shown for example in FIGS. 8 and 17), and thus the entirety of the outer surface in such embodiments is not rotationally symmetric with respect to the axis of rotation of the shaft.

The shaft to which the magnet assembly is attached may be non-magnetic, or may be soft-magnetic. The shaft may thus be an integral part of the magnet assembly.

Described below are now examples of different magnetic configurations in accordance with embodiments.

FIG. 1 shows two elevational views, in the (y,z)-plane and in the (x,z)-plane, respectively, and a plan view in the (x,y)-plane, of an embodiment of a magnet assembly in accordance with embodiments. As can be seen, the magnet assembly has a first magnet portion 1 of the magnet and a second magnet portion 2 of the magnet. The first and second magnet portions 1 and 2 are arranged such that a gap in a radial direction is formed therebetween. In FIG. 1, the gap between the first and second magnet portions 1 and 2 has a constant distance. As will be described later on with respect to FIGS. 7 to 19, other embodiments provide a gap between the first and second portions of varying gap distance. In other words, in the embodiment of FIG. 1 the surfaces of the first and second magnet portions 1 and 2 facing each other are parallel. Distinguished therefrom, in embodiments described with respect to FIGS. 7 to 19, at least a portion of a surface of the first magnet portion 1 opposing a surface of the second magnet portion 2 is non-parallel to at least a portion of the opposing surface of the second magnet portion 2. Furthermore, in the embodiment of FIG. 1, an upper main surface of the first magnet portion 1 is parallel with a lower main surface of the first magnet portion 1 (upper and lower being here defined with respect to the direction of the rotation axis). Similar, an upper main surface of the second magnet portion 2 is parallel with a lower main surface of the second magnet portion 2. In other words, in the embodiment of FIG. 1, the upper and lower main surfaces of each magnet portion 1 and 2 are separated by a constant distance. In other embodiments described with respect to FIGS. 7 to 19, at least one of the first and second magnet portions 1 and 2 has an upper main surface being non-parallel with a lower main surface. In other words, the distance between an upper main surface and a lower main surface of a respective magnet portion varies. In some embodiments, the distance between the upper main surface and lower main surface of a respective magnet portion varies continuously at least around a circle (e.g. a circle co-centric with the axis of rotation). In some embodiments, the distance between the upper main surface and lower main surface of a respective magnet portion varies continuously when moving at least in a first direction and a second direction perpendicular to the first direction. In some embodiments, for a first section (e.g. a first half) of a respective magnet portion, the distance between upper and lower main surface decreases continuously when moving along one direction and for a second section (e.g. a second half) of the respective magnet portion, the distance between upper and lower main surface increases continuously when moving in the one direction. In some embodiments, a respective magnet portion has a V-shape in a plane including the axis of rotation. In some embodiments, one of the upper and lower main surfaces of a respective magnet portion is perpendicular to the axis of rotation while the other one is non-perpendicular to the axis of rotation. In some embodiments, each of the first and second magnet portions 1 and 2 has an upper main surface being non-parallel with a lower main surface. In the embodiment of FIG. 1 and in other embodiments described herein, the first magnet portion 1 and the second magnet portion 2 completely surround the shaft 3, respectively. In the embodiment of FIG. 1, the first and second magnet portions 1 and 2 are disk-shaped, however other shapes can be provided in other embodiments. The geometry of the first magnet portion 1 and the geometry of the second magnet portion 2 are mirror-symmetrical with respect to the x-y plane (the x-y plane is identical to the z=0 plane). In the embodiment of FIG. 1, the geometrical shape of the first magnet portion 1 is identical to the geometrical shape of the second magnet portion 2 but shifted in axial direction. It is further to be noted that the geometric projections of the first and second magnet portions 1 and 2 in the z-y plane are also point-symmetrical in the z-y plane with respect to the origin (x,y,z=0) of the coordinate system. In other words, the second magnet portion 2 can be obtained by point-mirroring the first magnet portion 1 at the origin.

The first and second magnet portions 1 and 2 of the magnet assembly can be perpendicular to the z-axis, and the magnetization can be parallel to the y-direction in each of the magnet portions 1 and 2 of the magnet, or can be parallel in one portion and anti-parallel in the respective other portion. In the first embodiment having the magnetization parallel to the y-direction in both magnet portions 1 and 2 of the magnet, the z-component of the magnetic field at the reading circle (sensor element in the z=0 plane) disappears. The magnetization and the resulting magnetic field are therefore mirror-symmetrical as discussed above. In the other case when the magnetization in the first magnet portion 1 points in positive y-direction and the magnetization in the second magnet portion points in negative y-direction, the R and ψ components of the magnet field will disappear at the reading circle in the z=0 plane, where the sensor element(s) is/are placed. The magnetization and a resulting magnetic field outside of the magnet assembly is mirror-antisymmetrical as described above assuming that no other magnetic influences are present. As mentioned above, the latter case has a higher degree of symmetry compared to the first case.

In some embodiments, the magnetization may also be purely axial, for example, for y>0 in the first magnet portion 1, parallel to the z-axis, and for y<0 in the first magnet portion 1 anti-parallel to the z-axis (anti-parallel meaning reversed direction). In the second magnet portion 2, the magnetization can then be parallel to the z-axis for y>0 and anti-parallel to the z-axis for y<0. Alternatively, the magnetization may be in the second magnet portion 2 anti-parallel to the z-axis for y>0 and for y<0 parallel to the z-axis.

It is to be understood that embodiments may use also magnetizations with both, y-axis and z-axis components being non-vanishing, as will for example be described with respect to FIG. 2.

A magnetic field sensor is schematically shown in FIG. 1 at or within the radial periphery of the magnet portions. It is to be noted that the radial recess circulating around the axis of rotation allows the sensor to be placed within the radial periphery. Alternatively, the sensor can be located outside of the periphery, as shown by the dashed line designation of the field sensor. The sensor is located in all embodiments in the z=0 plane. As can be seen from FIG. 1, the magnetic field sensors are all placed radially outside of the shaft. In other words, the magnetic field is sensed only radially outside of the shaft and all magnetic field sensitive elements of the magnetic field sensors such as Hall sensing elements or magnetoresitive sensing elements are placed radially outside of the shaft.

Although one or two sensors may suffice to determine the magnetic field components at the respective locations, in embodiments three sensors may be provided, which may be oriented 120° apart from each other. Thus, all three sensors are at the same radial distance, yet their azimuthal coordinates in cylindrical reference frame are 0°, 120°, and 240°, respectively. The number of sensors required also depends on the symmetry of the magnet assembly. In the case of a higher degree of symmetry, the magnet generates a field with vanishing radial and azimuthal magnetic field components in the symmetry plane z=0. Then the angle sensor system needs sensor elements in at least two locations with different azimuthal coordinates. They may be all at the same radial distance (and since they are in the z=0 plane this means that they are on a reading circle which is concentric to the rotation axis). Such a system may have sensors at two locations, which are 90° spaced apart on the reading circle.

As mentioned above, it is even better for such a system to have sensors at three locations, which are mutually spaced apart by 120° on the reading circle. In an alternative case the magnet assembly generates a field with vanishing axial field component in the symmetry plane z=0. Then the angle sensor system detects one or both of radial and azimuthal magnetic field components. It may also have sensor elements at two positions, yet it may also have two sensor elements at the same position. In the latter case one of the two sensor elements may detect the radial field component and the other one may detect the azimuthal field component and the system can compute the rotational position of the magnet assembly by combining these two measured field components.

The sensor arrangement shown in FIG. 1 can be used in all embodiments described herein and is capable to provide measurements of the magnetic field components to determine the rotational angle of the shaft, but the sensor arrangement will not be repeated in each figure.

Figure 24:
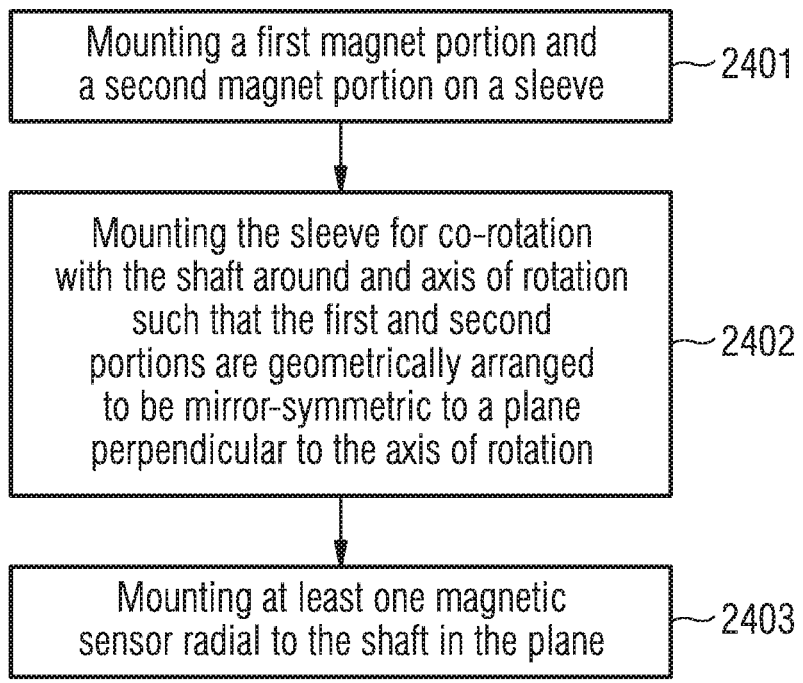
FIG. 24 shows a flow diagram of an embodiment for manufacturing an out-of-axis angle sensor system.
Figure 25A:
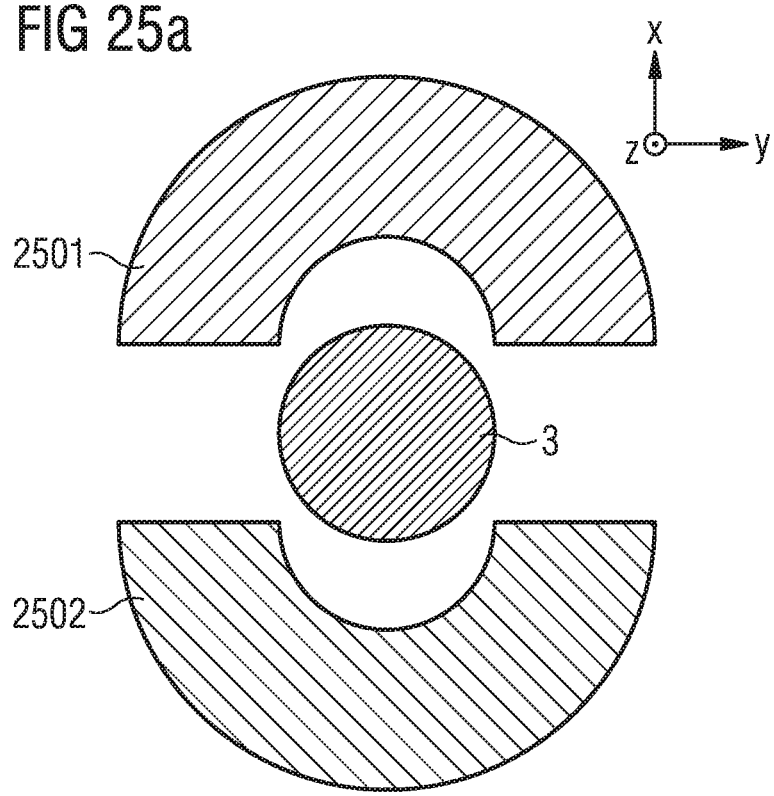
FIGS. 25A and 25B show examples of mounting a magnet portion by joining two sections.
Figure 25B:
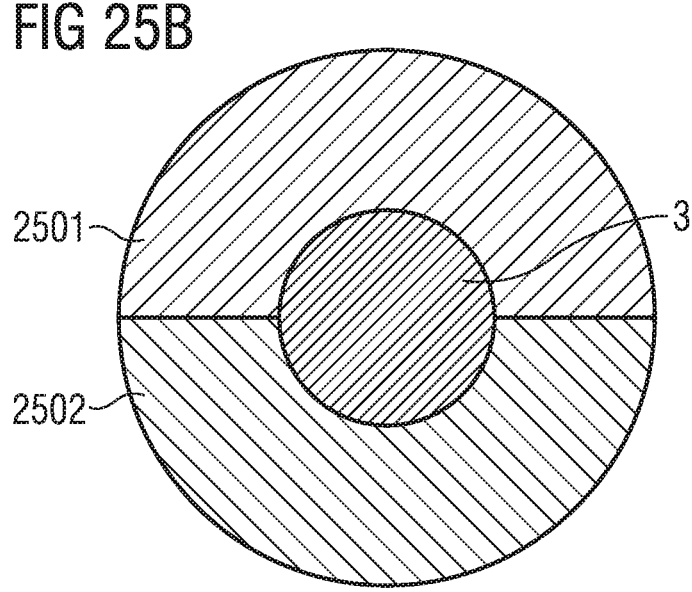

As also shown in FIG. 1, the shaft may be soft magnetic, and/or may optimally have a sleeve 6 as mounting structure for mounting the magnet portions to the axis. The permanent magnetic portions are attached to the sleeve 6 and the sleeve 6 is then placed over the shaft into a mounting position. The first and second magnet portions 1 and 2 in this embodiment are mounted on the soft magnetic sleeve and the sleeve 6 is mounted on the shaft 3. FIG. 24 shows a flow diagram of a manufacturing process according to an embodiment in which the first and second magnet portions 1 and 2 are pre-mounted on the sleeve before mounting on the shaft 3. The manufacturing process starts at 2401 with the mounting of the first magnet portion and the second magnet portion on a sleeve. At 2402, the sleeve is mounted on a shaft for co-rotation with the shaft around an axis of rotation such that the first and second magnet portions are geometrically arranged to be mirror-symmetrical to a plane oriented perpendicular to the axis of rotation. At 2403, at least one magnetic sensor is mounted radial to the shaft in the plane. FIGS. 25A and 25B show an example in which a respective magnet portion is manufactured by joining two separate sections 2501 and 2502. FIG. 25A shows the two sections 2501 and 2502 of the magnet portion prior to the joining as halves being separated from each other on respective opposite sides of the rotating shaft 3. FIG. 25B shows the two sections 2501 and 2502 after joining when the body formed by the two sections 2501 and 2502 encompasses the axis 3 with a tight fitting such that the axis 3 is clamped between the two sections 2501 and 2502. For joining the sections 2501 and 2502, auxiliary means may be provided such as a clamp or screws which are inserted into holes in each of the sections 2501 and 2502. In other embodiments, the halves may be mounted on a frame or disk in order not to apply mechanical pressure on the magnet when clamping on the shaft. Mounting to the shaft may then be provided by clamping the frame or disk to the shaft using appropriate means such as screws or clamps.

The halves can be provided in some embodiments by cutting the preformed full magnet portion (e.g. the full ring) into two halves. In other embodiments, the two halves may be pre-formed separately. The mounting of the magnet portion by joining two sections together around the shaft allows mounting the magnet portion without having to dismount the shaft. This may for example be advantageous for shafts having a bigger diameter or when replacing a broken magnet portion. In addition, it may be easier to magnetize each of the sections 2501 and 2502 separately. For embodiments which utilize reversed magnetizations in each of the sections 2501 and 2502, magnetization for the sections can be established by providing each section 2501 and 2502 separately in a same homogeneous magnetic field with one section being reversed or by providing both sections at the same time in a homogeneous magnetic field with one section being reversed. This avoids possible magnetic stray fields between the two sections 2501 and 2502.

It is to be noted that the sections 2501 and 2502 may also be joined to form the magnet portion prior to the mounting on the shaft 3. In other embodiments, the two sections 2501 and 2502 may be joined to encompass the sleeve 6, which is then mounted on the shaft 3. It is to be understood that the described joining and mounting can be provided for any of the various shapes and magnetizations of a magnet portion.

A sleeve may be useful because the magnets usually are fragile or brittle, so that they cannot be mounted on a shaft directly and so it is advantageous to manufacture the sleeve with the magnets in one step, such that there is a good mechanical contact between them (e.g. by injection molding the magnet over/around the sleeve). The sleeve 6 is preferably made from a metal such as steel that can be attached rigidly to the shaft 3 (e.g., by press-fitting or thermal shrinking it over the shaft 3). The sleeve 6 may also have spring elements (e.g. tongue) that exert a force between the sleeve 6 and the shaft 3. An embodiment of a sleeve having spring elements will be later described with respect to FIGS. 20A and 20B. The sleeve 6 may comprise one or more structures to align at least one of angular and axial positions of the sleeve with respect to the shaft. Such structures may allow a very accurate absolute positioning of the portions of the magnet assembly with respect to an angular position or an axial position. For example, the sleeve 6 may also have a hole or groove, which can be used to align the sleeve to the shaft 3 both in angular or axial direction. An embodiment of a sleeve having a hole will later be described with respect to FIG. 21. The sleeve 6 may have a coefficient of thermal expansion (CTE) that is matched to the shaft 3 and to the magnet. This is useful if the sleeve 6 is press-fit to the shaft but also in other embodiments to obtain a precise position of the magnet with respect to the shaft. The sleeve 6 also allows holding several portions of the magnet assembly in specified position relative to each other, possibly even prior to magnetization. If, e.g. the shaft is a massive part (e.g. the cam shaft of a large motor) it is better to pre-assemble the magnet assembly on the sleeve, which can be done very precisely in a dedicated environment/machine and to pull the sleeve 6 over the shaft 3 in a final step (which perhaps needs a large press and excessive temperatures (e.g. +250° C. or 100° C.). In embodiments, the sleeve 6 may be soft magnetic, because then the magnetic field on the sensor elements is less affected by the shaft. In other words, if the sleeve 6 is soft magnetic, the influences due to cases in which the shaft is soft magnetic compared to cases in which the shaft is not soft magnetic are minimized, with the soft magnetic sleeve being pulled over the shaft. Particularly, the magnetic field on the sensor elements does not depend notably any more on the magnetic properties of the shaft. Typically, the shaft has poorly defined magnetic properties, because it is selected for other purposes (e.g. to be wear resistant or high strength steel, where minute contents of alloy composition may change the magnetic permeability in a poorly defined way). The sleeve 6 thus makes the field robust against changes in the shaft. While in FIG. 1 the sleeve fully surrounds a circumference of the shaft 3 for mounting, it is to be understood that in other embodiments the sleeve may be formed to only partially surround a circumference of the shaft 3 (e.g. at least half or at least ⅔ of the circumference of the shaft 3). In some embodiments, the sleeve 6 may have slots or the sleeve 6 may have multiple sections distributed around the shaft 3. The distributed sections may be mechanically connected by one or more annular rings or other elements which surround the shaft 3.

The arrangement of permanent magnetic portions on the outer side of a sleeve as shown in FIG. 1 may apply to all embodiments, but is not repeated in each figure. Furthermore, it to be understood that any of the above described mounting mechanism, e.g. press-fitting, spring-attachment etc. can be applied to each embodiment described herein.

In addition to permanent magnetic parts there may also be soft magnetic parts, as shown in FIGS. 3-5, 8-14, 16, 17, whereby some or all of them may be mounted outside on the common sleeve. The term "magnet portion" is used to denote a portion comprising at least one permanent magnetic part and optionally one or more soft magnetic parts.

In the aforementioned embodiments, a magnetization of the magnet was either parallel or antiparallel to the y-direction or either parallel or antiparallel to the z-direction. In the following, embodiments that include a mixture of the magnetization directions in y- and z-directions will be described with respect to FIG. 2. FIG. 2 shows a view onto the (y,z)-plane.

The embodiment in FIG. 2 shows a magnetization pattern which makes radial and azimuthal field components vanish in the symmetry plane z=0. It can be regarded as a superposition of diametrical magnetization in +/−y-directions and axial magnetization in +/−z-directions in both of the first and second magnet portions 1 and 2. There are two limiting cases, (i) either the diametrical magnetizations vanish or (ii) the axial magnetizations vanish. In case (i) only axial magnetization is left, which means Mz>0 for y<0 (both in magnet portions 1 and 2) and Mz<0 for y>0 (both in magnet portions 1 and 2) with Mz being the z-component of the magnetization vector. In case (ii) only diametrical magnetization exists, which means My>0 in magnet portion 1 and My<0 in magnet portion 2 with My being the y-component of the magnetization vector. In both cases it still holds that radial and azimuthal magnetic field components in the mirror plane z=0 vanish, while the axial magnetic field component remains and is detected by the sensor elements. Note that the magnetization may be homogeneous in each section, yet in practical implementations it will typically be non-homogeneous: e.g. the magnetization pattern may be arc-shaped with larger magnitude of z-component near the maximum and minimum y-coordinates and smaller magnitude of z-component near y=0.

The general magnetization pattern with both diametrical and axial magnetization contributions as shown in FIG. 2 allows minimizing a stray flux of the magnet assembly to the surroundings. It is advantageous to minimize the stray flux because then the magnet arrangement minimizes disturbances of other nearby equipment. Moreover, small stray flux means that nearby ferrous parts of other equipment are subjected to less magnetic field from the magnet assembly and so they are less magnetized and thus they create smaller disturbance fields, which act on the sensor elements on the reading circle. This reduces angle errors. Similarly, smaller stray flux means smaller fields acting on nearby conductive parts, which reduces eddy currents induced there by the rotating stray field of the magnet assembly. Such eddy currents themselves generate magnetic fields which could be detected by the sensor elements on the reading circle and this again gives rise to angle errors. Smaller stray flux also reduces cross-talk between two or more angle sensor systems (either on the same shaft or on different shafts).

To generalize the above, the magnetization pattern in the first and second magnet portions 1 and 2 are aligned in embodiments to some dashed concentric oval path in the x=0 plane (which is a plane oriented to include the axis of rotation) and in planes parallel to the x=0 plane as shown in FIG. 2. The first and second magnet portions comprise a magnetization with at least four different magnetization vectors in respective sections along the concentric oval path, wherein the at least four different magnetization vectors have magnetization directions which are all aligned in a clock-wise order. Alternatively, the at least four different magnetization vectors may all be aligned in a counter-clockwise order. This pattern simultaneously minimizes stray flux emanating from the magnet arrangement and it makes radial and azimuthal field components vanish in the mirror plane z=0. Both aspects increase the accuracy of the angle sensor system. It can be further seen that, in the (y,z)-plane which is shown in FIG. 2, the magnetization is mirror-antisymmetrical with respect to the y=0 plane, i.e. a magnetization vector at the left side (y<0) is obtained by mirroring (at the y=0 mirror plane) the magnetization vector of the corresponding position at the right side (y>0) and then reversing the mirrored magnetization vector. Furthermore, in the x=0 plane in FIG. 2, the magnetization is also mirror-antisymmetrical with respect to the z=0 plane. Furthermore, it can be further seen that in the x=0 plane in FIG. 2 the magnetization is also point symmetrical with respect to the origin. Thus, in the x=0 plane, a projection of the magnetization of the second magnet portion into the x=0 plane is with respect to the origin central symmetrically to the magnetization of the first magnet portion. This can be seen in FIG. 2 since the magnetization vector of the left section of the second magnet portion 2 is obtained by a central symmetric mirroring of the magnetization vector of the right section of the first magnet portion 1. Similar, the magnetization vector of the right section of the second magnet portion 2 is obtained by a central symmetric mirroring of the magnetization vector of the left section of the first magnet portion 1. In other embodiments, the magnetization may have an inversed central symmetry, i.e. a projection of the magnetization of the second magnet portion into the x=0 plane may then be with respect to the origin central symmetrically to the inversed magnetization of the first magnet portion. Here, an inversed magnetization is a magnetization having the same magnitude but reversed direction. In other words, an inversed magnetization is a magnetization in which the magnetization vectors are multiplied by −1.

In general, the magnetization can be provided such that the DC part of the magnetic field disappears along the reading circle, which allows increasing the degree of symmetry. The effect of manufacturing tolerances on the angular error is thereby minimized. The DC part of a field component as used herein is the average of this field component along the reading circle over a full revolution. In general the magnetic field may be a wavy curve along the reading circle for example similar to a sine-wave with one positive half and one negative half. If the positive half has equal magnitude and opposite sign to the negative half the curve is centered around zero, which means that its DC part vanishes. In case a DC part is present, the magnetic field may have along the reading circle two points at which the magnetic field component reaches the DC part of the magnetic field.

In general, the DC part of a magnetic field component along the reading circle disappears (equal to 0) when the following conditions are fulfilled. First, the geometric shape of the first magnet portion 1 of the magnet assembly has two mirror-symmetrical parts, hereinafter referred as the first and second sections, with the mirror-symmetry plane being parallel to and comprising the axis of rotation. Examples of such mirror-symmetry planes are e.g. x=0 plane (equal to the y-z plane) in FIG. 1 or FIG. 7 or y=0 plane (equal to the x-z plane) in FIG. 1. Note that in FIG. 7 the y=0 plane is no symmetry plane. Second, the magnetic charge distribution of the first sections is of the same magnitude, but of an opposite sign, as the magnetic charge distribution of the second section. Third, similar to the first magnet portion 1, also the second magnet portion 2 has two mirror-symmetric sections, herein referred as the third and fourth section, whereby the magnetization pattern in the magnet portion 2 is either mirror-symmetric or mirror-antisymmetric to the magnetization pattern in magnet portion 1, as explained above.

The embodiment shown in FIGS. 1 and 2 can be modified by adding soft magnetic portions with respect to the aforementioned first and second magnet portions, as is shown next.

Figure 3B:
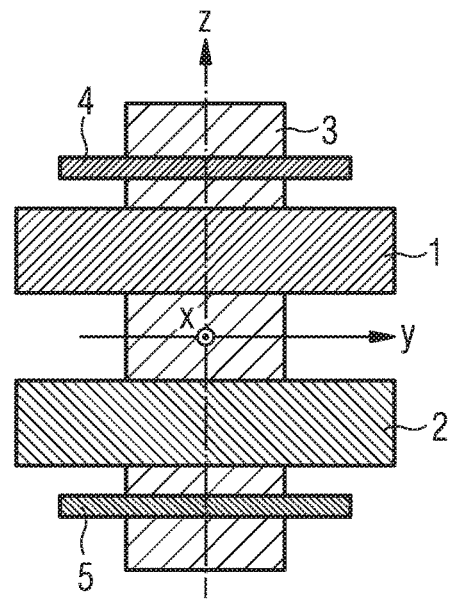

In the embodiment shown in FIG. 3a, the soft magnetic portions 4 and 5 are respectively adjacent to the first and second magnet portions 1 and 2, and axially outside those portions, and they extend radially beyond the radial perimeter of the magnet portions. In FIG. 3b the soft magnetic portions 4 and 5 are spaced from the magnet portions 1 and 2 on the shaft 3, and have a radial extent that is smaller than the radial extent of the magnet portions 1 and 2.

Figure 3C:
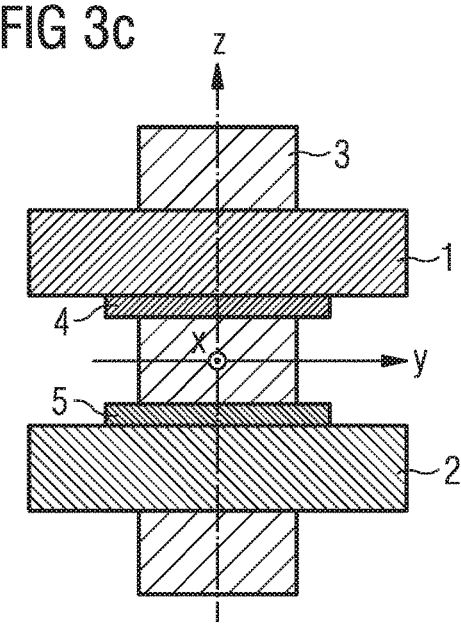

In FIG. 3c the soft magnetic portions 4 and 5 are placed axially inside of the two magnet portions 1 and 2, and have a radial extent that is smaller than the radial extent of the first and second magnet portions 1 and 2. It is to be noted that the example arrangements shown in FIGS. 3a, 3b and 3c can be applied to any of the embodiments described herein.

In the embodiment shown in FIG. 4, soft magnetic portions 4 and 5 are both axially outside of the magnet portions 1 and 2 and are slightly angled with respect to the x/y plane. This arrangement provides a good mechanical protection for the first and second magnet portions 1 and 2 as well as a protection against stray fields.

The two magnet portions 1 and 2 need not necessarily be separated, and can be merged to form a unitary portion. The merged portions may still exhibit a gap or recess therebetween, as shown in the embodiment of FIG. 5, or there may be no gap or recess between the merged portions, as shown in the embodiment of FIG. 6. When the first and second magnet portions 1 and 2 are merged, the procedure for producing the magnetization can be selected so as to be beneficial, but it may also be detrimental if appropriate considerations are not adhered to. It is advantageous for both magnet portions to have an identical magnetization, because then the magnetization of the merged portions can be done with one procedure, e.g. with a single magnetizing field pulse for the entire assembly. This increases the homogeneity of the magnetization, and thus the accuracy with which the magnetic field is generated, and thus ultimately the accuracy of the angle sensor.

If it is desired, however, to produce a magnetization distribution or pattern in the magnet assembly that is not homogenous, either within the individual portions or within the portions respectively, it is usually less expensive to manufacture these portions separately and to magnetize the portions separately, followed by assembly of the portions. Only in individual cases can non-homogeneous magnetization be achieved by magnetization of the overall assembly in one procedure, e.g. with a single magnetizing field pulse.

FIGS. 3-6 show magnet assemblies with rotationally symmetric geometry (rotational symmetric with respect to the axis of rotation) as it is symbolized by the dash-dotted z-axis.

Further embodiments are also shown in FIGS. 7-19. In general, the embodiments in FIGS. 7-19 have in common that the first and second magnet portions 1 and 2 are configured to be mounted on the shaft mirror-symmetrically with respect to a first plane, and each of the first and second magnet portions has a first surface facing away from the first plane and a second surface facing the first plane, with a first spacing between the respective first surfaces of the first and second magnet portions, and a second spacing between the respective second surfaces of the first and second magnet portions, with at least one of the first and second spacing varying along a full rotation of the shaft. In other words, the respective spacing varies along a circle in a plane perpendicular to the axis of rotation and centered with the axis of rotation with the spacing measured as distance between the first and second portion in a direction perpendicular to the plane in which the circle is located. As can be seen from FIG. 7, the spacing continuously decreases in at least one direction (e.g. a direction parallel to the y-direction in FIG. 7). Furthermore as can be seen from FIG. 7, the distance between the first and second surface of the first magnet portion 1 varies in at least one direction (e.g. a direction parallel to the y-direction in FIG. 7) Similar, the distance between the first and second surface of the second magnet portion 2 varies in at least one direction. As can be seen from FIG. 7, the distance between the first and second surface of the first magnet portion 1 continuously decreases when moving along at least one direction (e.g. a direction parallel to the y-direction in FIG. 7) Similar, the distance between the first and second surface of the second magnet portion 2 continuously decreases when moving along at least one direction (e.g. a direction parallel to the y-direction in FIG. 7). Furthermore, as a consequence, when moving along a circle between the first and second magnet portions 1 and 2 with the circle being in a plane perpendicular to the axis of rotation and concentric with the axis of rotation (e.g. the reading circle), a first distance measured from the circle in the direction parallel to the rotation axis to the first magnet portion 1 and a second distance measured from the circle in the direction parallel to the rotation axis to the second magnet portion 2 continuously vary. When moving 360 degrees along the circle, the varying first distance has only one maximum and only one minimum and the varying second distance has only one maximum and one minimum, with the positions of the maximum being identical for both varying distances and the positions of the minimum being identical for both varying distances.

Figure 8:
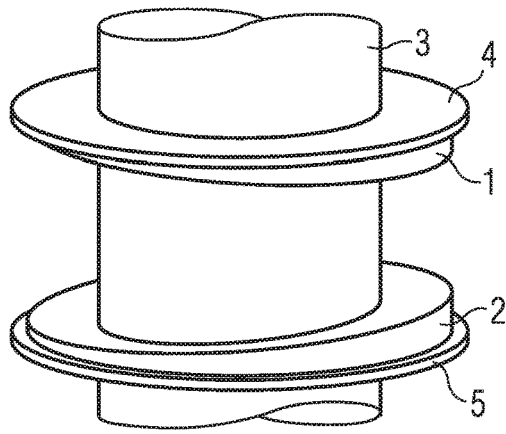
FIG. 8 is a perspective view of an eighth embodiment of the magnet assembly shown in FIG. 7.

A non-rotationally symmetric magnetic assembly configuration can be as shown in FIGS. 7 and 8. As shown therein, both the upper and lower magnet portions can be formed cylindrical, but with a planar surface along the y-axis that is tilted, such as by about 20° relative to the rotational axis of the shaft. In this embodiment as well, many magnetization patterns are possible. For example, the upper and lower portions can be diametrically magnetized in the same direction or opposite directions, or the upper portion can be magnetized in the positive z-direction, and the lower portion in the negative z-direction. The portions may also be non-homogenously magnetized as described above.

It is to be noted that in the embodiment of FIG. 7, for a projection into the y=0 plane (view of the geometrical protection into the y=0 plane is shown on the right side of FIG. 7), the geometrical shape of the second magnet portion 2 is central-symmetrically to a geometrical shape of the first magnet portion with respect to the origin. However for the geometrical projection into the x=0 plane (view of the projection into the x=0 plane is shown in FIG. 7 on the left side), a geometrical shape of the second magnet portion is not central-symmetrically to a geometrical shape of the first magnet portion with respect to any point in the x=0 plane. This geometrical asymmetry applies also to the embodiments described in FIGS. 8 to 14. Furthermore, in view of the non-rotational symmetry, the shapes of geometrical projections of the first magnet portion 1 into the x=0 plane and into the y=0 plane are different as can be seen by comparing the views shown on the right hand side (y=0 plane) and left hand side (x=0 plane) of FIG. 7. The same holds for the shapes of geometrical projections of the second magnet portion 2 into the x=0 plane and the y=0 plane. This geometrical asymmetry applies to the embodiments described with respect to FIGS. 8 to 19.

It is to be noted that in the magnet assembly of FIG. 7, in the symmetry plane z=0 the magnetic field is larger if the thick parts of the permanent magnets approach a sensing element than for thin parts. This provides a varying magnetic field along the reading circle which gives an oscillating signal at the sensing element when the magnet assembly rotates around the rotation axis having exactly one maximum value and one minimum value per revolution, whereby maximum and minimum values are shifted by 180° in angular position.

Figure 9A:
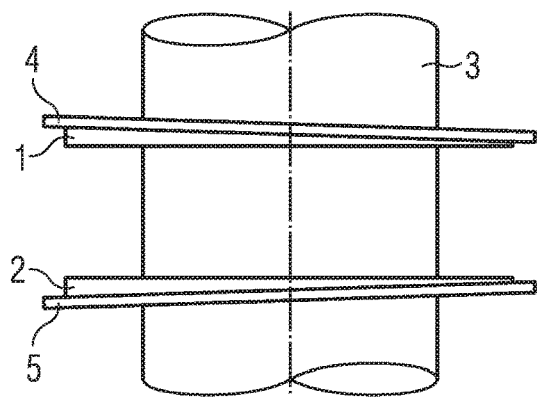
FIGS. 9A and 9B show respective elevational views of a ninth embodiment (similar to FIG. 8 but with small alterations).
Figure 9B:
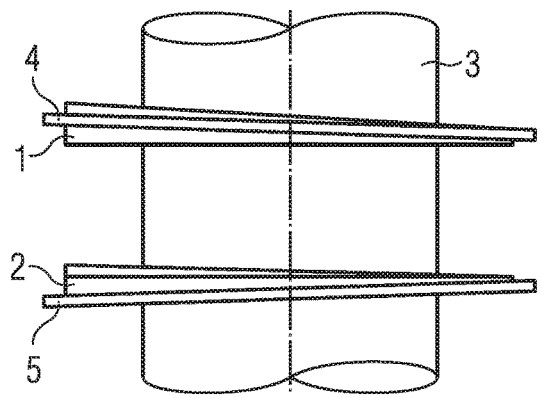

The embodiment of FIG. 8 uses the permanent magnet configuration of FIG. 7, with additional soft magnetic discs 4 and 5 at the axially outer surfaces of the respective magnet portions 1 and 2, as shown in FIG. 8. In the embodiment of FIG. 8, these soft magnetic discs 4 and 5 are perpendicular to the z-axis but, as shown in the embodiment of FIGS. 9A and 9B, the soft magnetic discs 4 and 5 as well as the entirety of the respective magnet portions 1 and 2 can be oriented at non-perpendicular angles with respect to the z-axis. The wedge of the permanent magnets and the tilts of magnets and soft magnetic plates can be combined in many ways to optimize the field pattern along the reading circle; one may minimize deviations from pure sinusoidal angular dependence, make the DC-part vanish, and make derivatives of various field components versus axial and radial position vanish. The permanent magnetic portions are preferably magnetized in the axial direction and from both possible options the mirror-antisymmetric one is again preferable. At those angular positions at which the air gap between the two soft magnetic rings is minimal, the Bz field at the reading radius is maximum. At those angular positions at which the air gap between the two soft magnetic rings is maximum, the Bz field at the reading radius is minimal. In the embodiment of FIGS. 9A and 9B, the soft magnetic portions 4 and 5 have a radial extent that is larger than the radial extent of the magnet portions 1 and 2. In the embodiment shown in FIGS. 10 and 11, the radial extent of the magnet portions 1 and 2 is larger than the radial extent of the soft magnetic portions 4 and 5. The magnets in FIGS. 8 and 9A, 9B are wedge-shaped whereas the magnets in FIGS. 10-14 have homogenous thickness, which may facilitate its manufacturing and increase its structural stability.

Figure 12A:
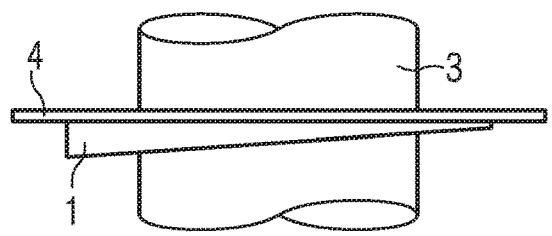
FIGS. 12A-12D show an elevational view of an upper half of magnet assemblies.

FIGS. 8 to 11 show multiple embodiments of tilts and wedges of the magnetic portions 1 and 2 and the soft magnetic portions 4 and 5. FIGS. 12A-D show in y-z elevational views the upper half of the magnet assembly which includes magnet portion 1 and soft magnetic portion 5. FIG. 12A corresponds to the embodiment of FIG. 8 and shows that the soft magnetic portion 4 has homogenous thickness and is arranged orthogonal to the axis of rotation. The magnet portion 1 of FIG. 12A is wedge-shaped with the smaller end of the wedge-shape being on the right side.

Figure 12B:
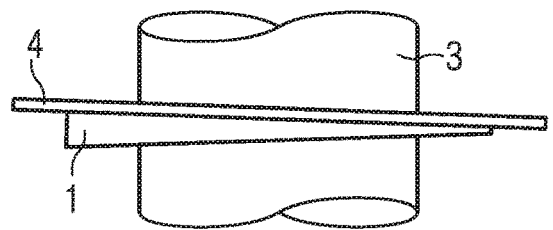

FIG. 12B corresponds to the embodiments of FIGS. 9A and 9B and shows the soft magnetic portion 4 having a homogenous thickness. Distinguished from FIG. 12A, the soft magnetic portion 4 is tilted such that a right hand side is lower than the left side in the y-z elevational view. Furthermore, in FIG. 12B the magnet portion 1 is wedge-shaped with the smaller end of the wedge-shape being on the right side and the inward side (side facing the magnet portion 2) of the magnet portion 1 being non-orthogonal to the axis of rotation. The inward side of the magnet portion 1 is inclined such that in the y-z elevational view a left hand side is lower than a right hand side.

Figure 12C:
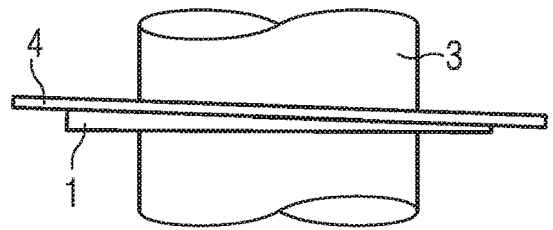

FIG. 12C shows an embodiment in which the soft magnetic portion 4 has a homogenous thickness and is tilted and the magnet portion 1 is wedge-shaped. Distinguished from FIG. 12B, the tilt of the soft magnetic portion 4 and the wedge-shape of the magnet portion 1 are balancing each other such that the inward side of the magnet portion 1 is orthogonal to the axis of rotation.

Figure 12D:
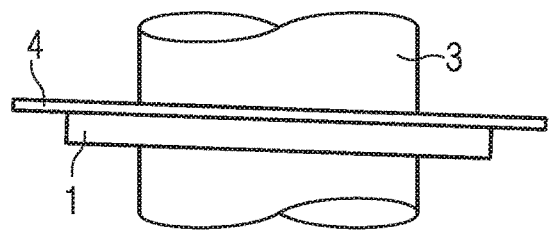

FIG. 12D shows an embodiment corresponding to FIGS. 10 and 11. Here both the soft magnetic portion 4 and the magnet portion 1 have a homogenous and both are tilted such that in the y-z elevational view shown in FIG. 12*d* the right hand side is lower than the left hand side.

Furthermore, while FIGS. 8 to 11 shows the magnet portion 1 abutting the soft magnetic portion 4 and the magnet portion 2 abutting the soft magnetic portion 5, it is to be understood that the various tilts and wedges can be provided also with an air gap or non-magnetic material between the respective magnet portions and soft magnetic portions.

Figure 13:
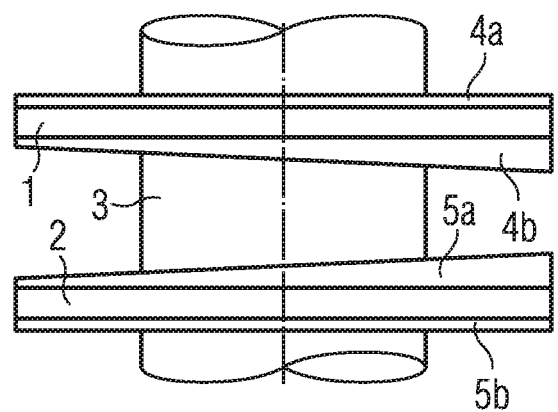
FIG. 13 shows an elevational view of another embodiment of the magnet in accordance with embodiments.
Figure 14:
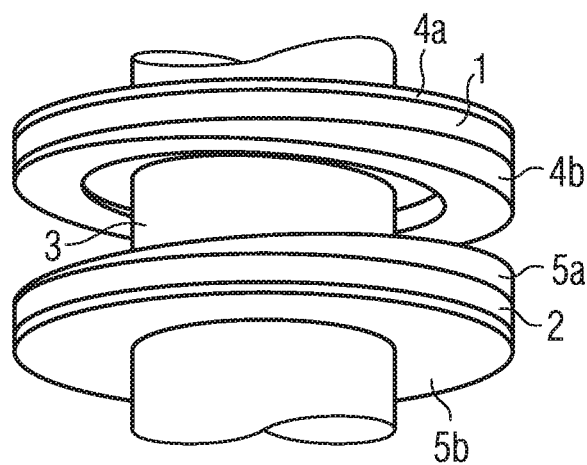
FIG. 14 shows a perspective view of the embodiment of FIG. 13.

A further embodiment is shown in FIGS. 13 and 14, wherein soft magnetic rings 4*a* and 4*b*, and 5*a* and 5*b*, are provided on both sides of the two magnet portions 1 and 2, the outer soft magnetic rings 4*a* and 5*b* being at least with their inner surfaces perpendicular to the z-axis of the shaft, and the other air gap-facing soft magnetic rings 4*b* and 5*a* each having an inner surface that is inclined with respect to the z=0 plane. The diameter of the reading circle should lie between inner and outer diameters of the inner rings 4*b*, 5*a* and their radial width should not be too large. In particular it must not approach the shaft, if the shaft is soft magnetic, because this would cause the field on the sensor element(s) to be very weak. In FIGS. 13 and 14 the rings 4*a* and 5*b* have an inner diameter equal to the shaft diameter, whereas rings 4*b* and 5*a* have an inner diameter that is larger than the shaft diameter (which becomes visible in FIG. 14 where the view on the ring 4*b* from the bottom side is visible). The permanent magnets of embodiments in FIGS. 13, 14 are preferably magnetized in axial direction and with homogeneous intensity, because any magnetization perpendicular to the rotation axis would be shorted by the two soft magnetic rings. As a consequence of this magnetization pattern it is not possible to make the DC-part of the magnetic field along the reading circle vanish.

Figure 15:
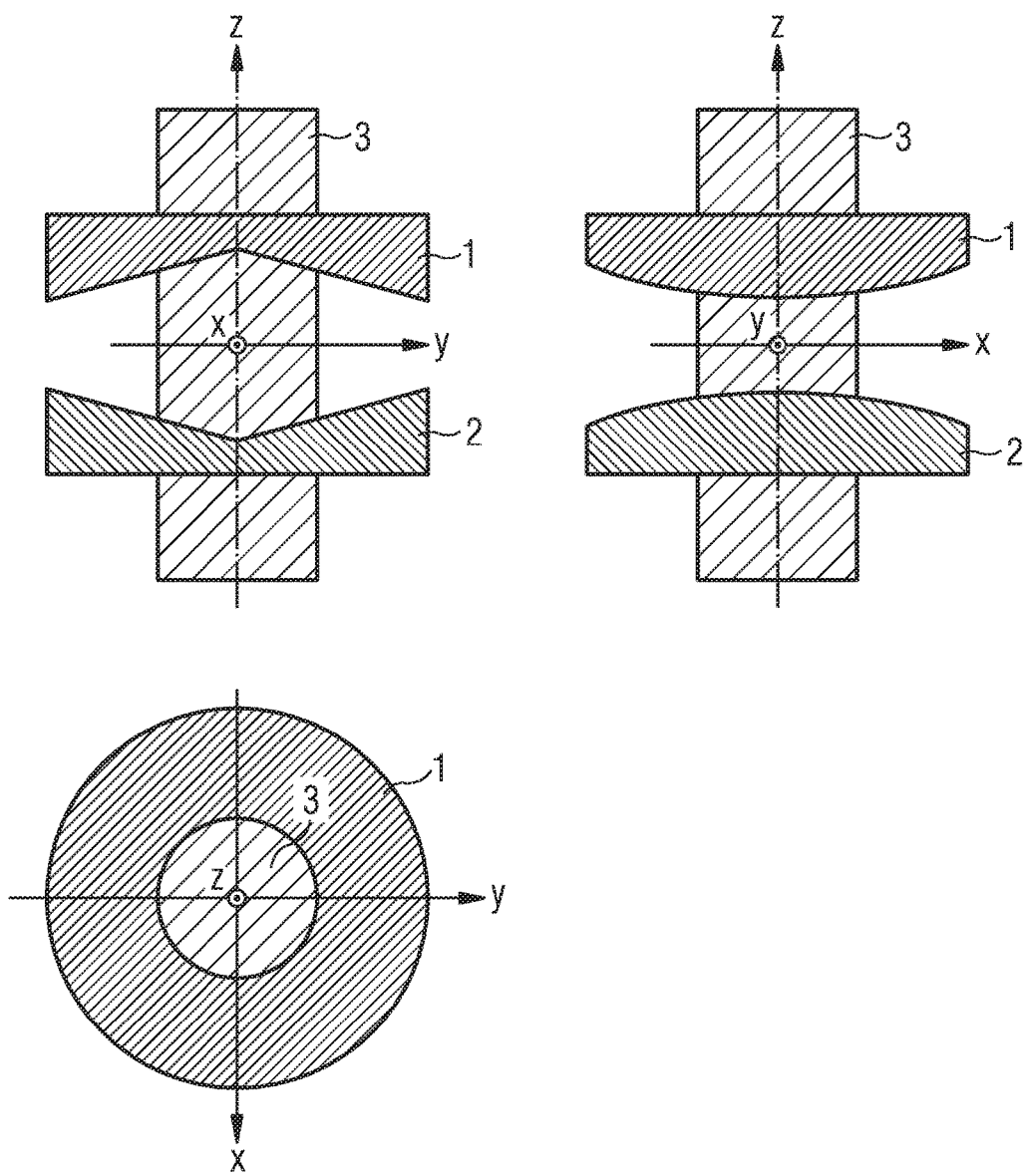
FIG. 15 shows elevation and plan views of another embodiment of the magnet in accordance with embodiments.
Figure 16:
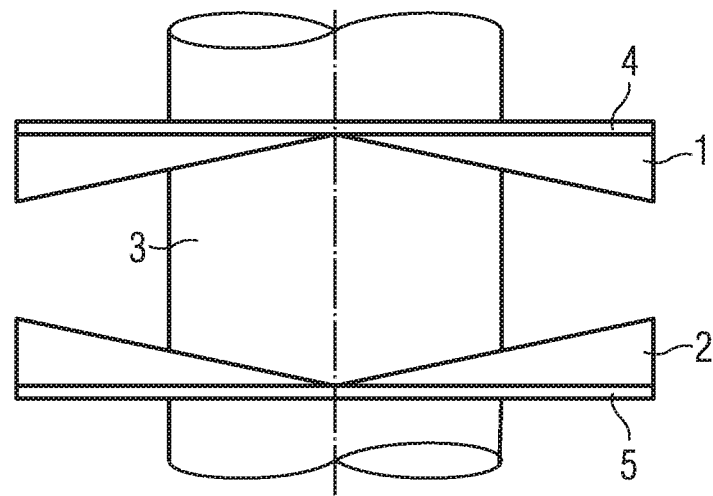
FIG. 16 shows an elevational view of another embodiment of the magnet in accordance with embodiments.
Figure 17:
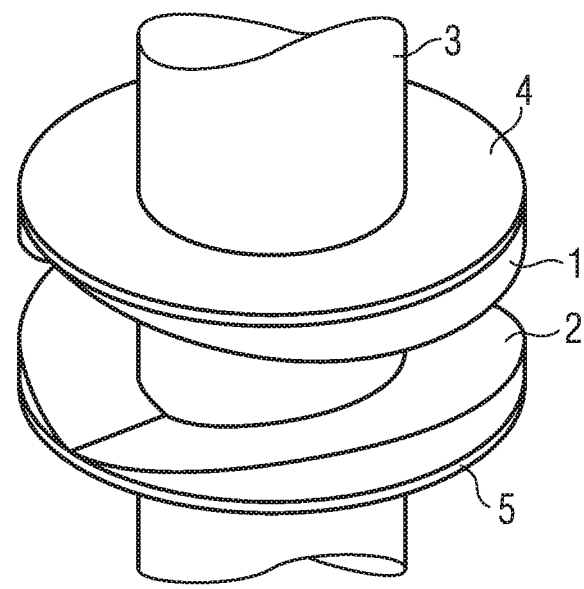
FIG. 17 shows a perspective view of the embodiment of FIG. 16.

Another embodiment of a magnet assembly with non-rotationally symmetry is shown in FIGS. 15, 16 and 17. FIGS. 15, 16 and 17 show respective magnet assemblies with wedge-shaped first and second magnet portions 1 and 2. Distinguished from the embodiments of FIG. 7, the arrangements according to FIGS. 15, 16 and 17 have two positions where the first and second magnet portions 1 and 2 reach a minimal axial thickness. The two positions of minimal thickness are diametrically arranged with respect to the axis of rotation. Thus, as can be seen from the left side of FIG. 15 which shows a projection into the (y,z)-plane, the geometrical shape in the y-z elevation is symmetric with respect to the axis of rotation in this projection. In the y-z elevation, the thickness of the first and second magnet portions 1 and 2 decreases continuously when moving from the outer surfaces towards the axis of rotation. Hence, the minimum thickness is obtained at y=0 at the respective two diametrical points. In FIG. 15, the wedge-shape has a non-vanishing minimal thickness at each of the two diametrical points of minimal thickness. Distinguished therefrom, the thickness of the wedge shaped first and second magnet portions 1 and 2 decreases in the embodiment of FIGS. 16 and 17 to zero at the two diametrical points of minimal thickness.

Furthermore, similar to the embodiments of FIG. 7-14, the respective spacing between the first and second magnet portions 1 and 2 varies along a circle located in a plane perpendicular to the axis of rotation and centered with the axis of rotation (e.g. a circle parallel to the reading circle). Furthermore, when moving from a point on the rim straight in at least one direction, (e.g. a direction parallel to the y-direction) the spacing continuously increases in a first region (e.g. in FIG. 15 a region which is located on the left side of the rotation axis) and continuously decreases in a second region (e.g. in FIG. 15 a region which is located on the right side of the rotation axis). It is to be noted that in view of the bore provided to mount the axis, when moving straight in a direction (e.g. direction parallel to y-axis) such that the line crosses the bore region, the spacing continuously increases from the rim up to where the bore begins and starts to continuously decrease at the end of the bore until the rim is reached on the other side.

When moving straight in a line parallel to the y-axis such that the line does not cross the bore region (e.g. a line that is parallel to the y-axis but offset from the center of the axis by more than a radius of the bore), the spacing continuously increases from a rim position until a first maximum is reached at a central position and continuously decreases from there until the rim is reached at the other side. Furthermore as can be seen from FIG. 15, the distance between the first and second surface of the first magnet portion 1 varies in at least one direction (e.g. y-direction). Similar, the distance between the first and second surface of the second magnet portion 2 varies when moving in at least one direction (e.g. y-direction). As can be seen from FIG. 15, the distance between the first and second surface of the first magnet portion 1 continuously decreases in a first region when moving along at least one direction (e.g. y-direction) and continuously increases in a second region. Similar, the distance between the first and second surface of the second magnet portion 2 continuously decreases when moving along at least one direction in a first region and then continuously increases in a second region. For each of the magnet portions, when moving straight in at least one direction (e.g. parallel to the y-axis) such that the line crosses the bore region, the thickness continuously decreases from the rim up to where the bore begins and starts to continuously increase at the end of the bore until the rim is reached on the other side. When moving straight in a line parallel to the y-axis such that the line does not cross the bore region (e.g. a line that is parallel to the y-axis but offset from the center of the axis by more than a radius of the bore), the thickness continuously decreases from a rim position until a first minimum is reached at a central position and continuously increases from there until the rim is reached at the other side. Furthermore, as a consequence, when moving along a circle between the first and second magnet portions 1 and 2 with the circle located in a plane perpendicular to the axis of rotation and centered with the axis of rotation (e.g. the reading circle), a first distance measured from the circle to the first magnet portion 1 in the direction parallel to the rotation axis and a second distance measured from the circle to the second magnet portion 2 in the direction parallel to the rotation axis continuously vary. When moving 360 degrees along the circle, the varying first distance has two maxima and two minima and the varying second distance has two maxima and two minima, with positions of the maxima being identical for first and second varying distances and positions of the minima being identical for the first and second varying distances. The two positions of maxima are diametrically arranged to each other and the two positions of minima are diametrically arranged to each other.

It is to be noted that with the above described configuration and shape of the magnet portions 1 and 2, each of the magnet portions 1 and 2 can be utilized alone without the other magnet portion for angle sensing. In particular in combination with the above described magnetization in which the magnet portion has reversed axial magnetization components in a first half (e.g. from left outer surface to y=0 in FIGS. 15,16 and 17) and a second half (e.g. from right outer surface to y=0 in FIGS. 15, 16 and 17) with the first half and the second half interfacing at the location of minimum thickness (e.g. y=0 in FIGS. 15,16, and 17), the usage of a single magnet portion provides a stable and reliable absolute angle sensing. The reversed axial magnetization components result in a first magnetic surface charge distribution and a second surface charge distribution, the first and second surface charge distributions having opposite signs. For example in the FIGS. 15, 16 and 17, a surface charge of the first half of the magnet portion may provide at the wedged side a north pole and a surface charge of the second half of the same magnet portion may provide at the wedged side a south pole. Utilizing a single magnet portion, the reading circle may be axially offset to the wedged surface. As described above, when moving 360 degrees along the reading circle, a distance measured between the reading circle and the wedged side in a direction parallel to the axis of rotation changes from a first maximum distance obtained at the first location of minimum thickness of the magnet portion (y=0) to a first minimum distance (x=0) and again to a second maximum distance obtained at the second location of minimum thickness of the magnet portion (y=0) followed by a second minimum distance (x=0). Thus, when moving 360 degrees along the reading circle, the distance between the reading circle and the wedged side continuously changes with 2 local minima and 2 local maxima, wherein between a respective maximum and a respective minimum the distance continuously decreases.

As outlined above with respect to FIG. 7, in the plane z=0 the magnetic field is larger if the thick parts of the permanent magnet approaches a sensing element than for thin parts. The varying axial thickness provides also in the above embodiment a varying magnetic field along the reading circle which gives an oscillating signal at the sensing element when the magnet assembly rotates around the rotation axis. By selecting a magnetization for the magnet portion as described above where the magnet portion has reversed axial magnetization components in a first half and a second half with the first half and the second half interfacing at the location of minimum thickness, the sign of the measured magnetic field component is reversed at the two minimum axial thickness positions. This allows to achieve a 360 degree absolute angle sensing although the absolute amplitude of the sensed magnetic field component oscillates in correspondence with the axial thickness with an oscillation period of 180 degree (180 degree=Pi radians). However, since the magnetic field is reversed at the minimum axial thickness positions, the measured signal provides a signal with an oscillation period of 360 degree provided the sensor is capable to distinguish the reversed magnetic field. The signal then crosses twice per revolution zero at the positions of minimum axial thickness per revolution. The magnet portion according to the embodiments of FIGS. 15-18 having diametrical positions of minimum thickness allows the magnet portion easily to be cut into two halves along the line connecting the positions of minimum thickness which allows easily the joining of two halves as described earlier with respect to FIGS. 25A and 25B. It is however to be understood that the first and second halves may include in other embodiments sectional portions other than exactly halves.

Figure 18:
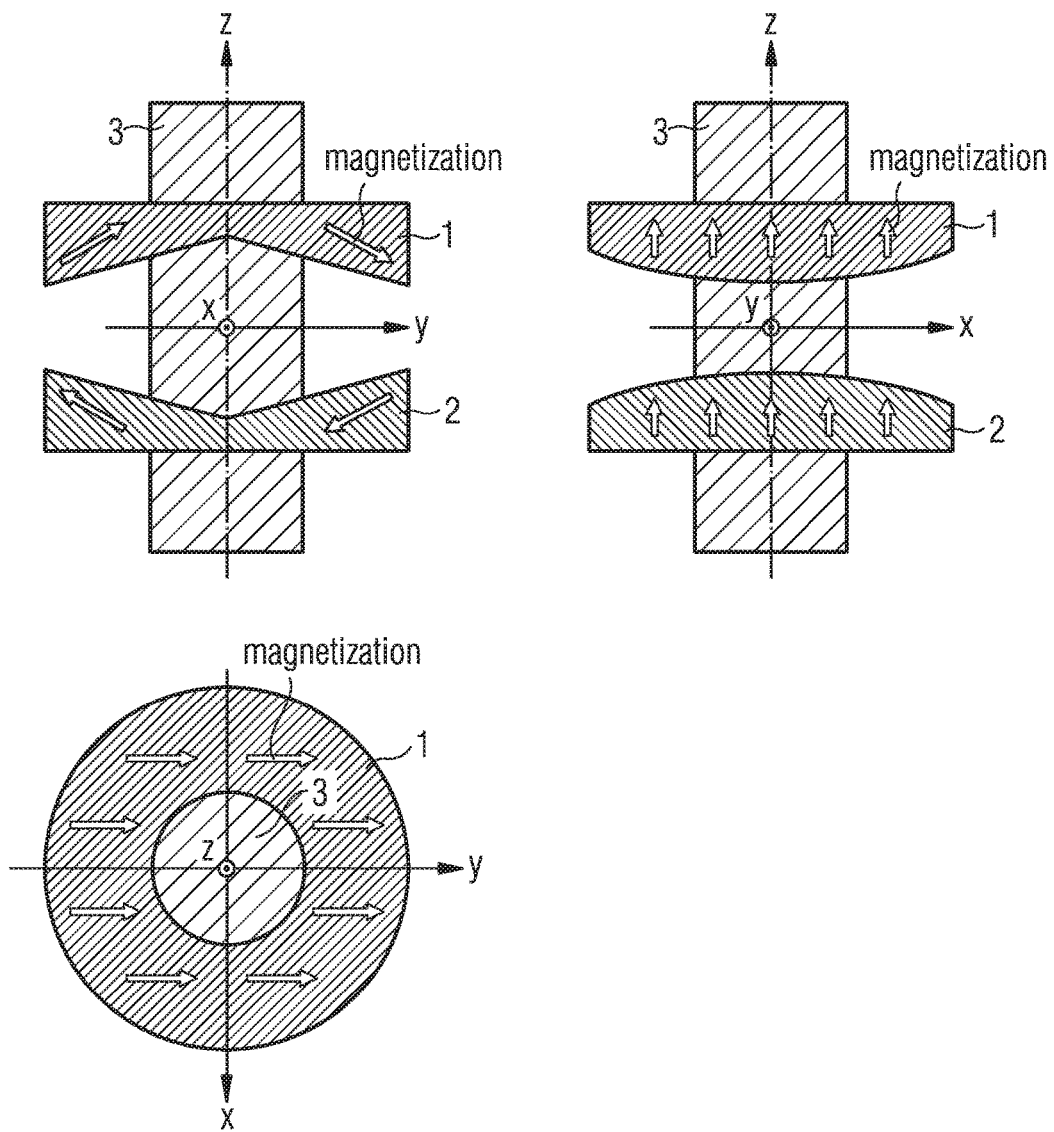
FIG. 18 shows elevation and plan views and indicates a magnetization pattern of another embodiment of the magnet in accordance with embodiments.

Similar to the rotational-symmetric embodiments shown in FIGS. 1 to 6, the non-rotational-symmetric embodiments can be implemented with various magnetizations. One example magnetization for the geometrical arrangement of FIG. 15 is shown in FIG. 18. This magnetization pattern can be considered as a "bipolar" arrangement because the magnetic field is directed oppositely for the respective portions, with the magnetization of the portions as shown in FIG. 18. This arrangement provides in the z=0 plane (x-y plane) vanishing magnetic components BR and Bψ and a non-vanishing magnetic component Bz. Thus, this arrangement provides a mirror-antisymmetric magnetization and magnetic field (with respect to the z=0 mirror plane) in which the Bz field is sensed by the sensor and used for determining the angle of rotation. As visible in the yz-elevation of FIG. 18, the magnetization (i.e., the white arrows) goes around clockwise in a circular shape (e.g. along an oval path as shown in FIG. 18), which has the advantage to produce smaller stray fields than pure diametrical or axial magnetization patterns. As already described with respect to FIG. 2, smaller stray field means that the field of the rotating magnet assembly on nearby portions outside the magnet assembly is smaller, yet in the gap between the two magnet portions (i.e., in the z=0 plane) it is still large. Small field outside the magnet assembly is advantageous, because then the sensor arrangement produces less disturbance on nearby systems which might be disturbed by magnetic fields. Moreover, smaller stray field means less interaction of the sensor system with nearby soft magnetic portions (like e.g. ferrous bolts of other machinery) and this makes the angle sensor more robust against ferrous environment. Another advantage of the magnetization pattern shown in FIG. 18 is that for any magnetic pole in y<0 there is a mirror-symmetric pole in y>0 mirrored at the plane y=0 with equal magnitude and opposite sign. Therefore this magnetization pattern generates a Bz-field along the reading circle, which has vanishing DC-part. Furthermore, a magnetization according to another embodiment may have the first magnet portion 1 magnetized in the same manner as shown in FIG. 18 but may have the magnetization directions reversed for the second magnet portion 2 (which corresponds to mounting the second magnet portion 2 rotated by 180 degree around the axis of rotation). The resulting magnetic field which is generated by this arrangement has a vanishing magnetic z-component Bz while the BR and Bψ components are non-vanishing and are available for determining the angle of rotation.

Figure 19:
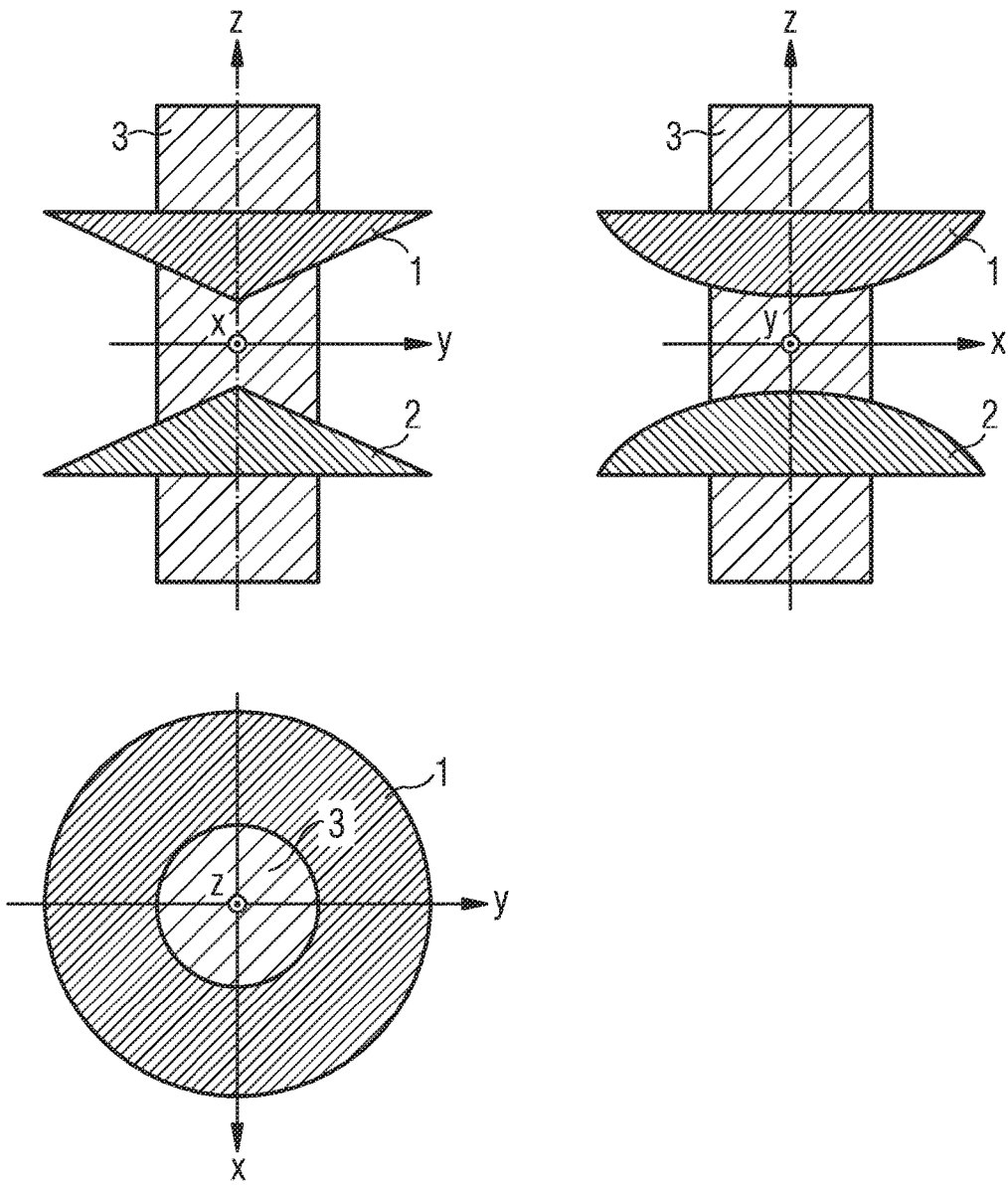
FIG. 19 shows elevation and plan views of another embodiment of the magnet in accordance with embodiments.

Another embodiment of a magnet of non-rotational symmetry is shown in FIG. 19. It can be derived from a cylindrical shape, where in the (y,z)-elevation the lower left and right parts of portion 1 are cut off. So the final shape of portion 1 in (y,z)-elevation is a triangle, whereas in (x,z)-elevation it is a part of a disk, and in (x,y)-plan view it is a ring. The magnetization may again be diametrical or axial (with opposite polarity in y<0 and y>0) or any mixture of the two. Optionally one could add soft magnetic disks concentric and perpendicular to the rotation axis outside the magnets so that the magnets are in-between the disks. Like with all arrangements disclosed the magnets and the soft magnetic parts may be fixed to a sleeve, which is pulled over the shaft.

Each of the above described embodiments can be modified to include additional structures for mounting the sleeve 6 to the shaft 3. FIG. 20A shows a perspective view of an example in which the sleeve 6 is formed to include spring elements 8 for providing a force to the shaft. In FIG. 20A, the spring elements 8 are formed by providing the sleeve 6 at an end with slits 9. The slits 9 have an elongated shape in the direction of the axis of rotation. The spring element 8 is formed between the slits 9. At each end of a respective slit 9, the slit 9 has an extended portion 9A. As shown in FIG. 20A, the extended portion 9A of the slit may have a circular shape which allows the spring element to be flexible towards the axis of rotation. The spring element 8 can therefore be bowed towards the axis. When sliding the sleeve 6 over the shaft 3, the spring element 8 will therefore exert a mechanical load onto the shaft 3 which keeps the sleeve 6 after mounting in the mounting position. The inner bore diameter of the sleeve at z-positions between 9A and its upper end may be smaller than the inner diameter of the rest of the sleeve, particularly inside the magnets. This guarantees that the force from the shaft to the sleeve and eventually to the magnets is less than the force between spring 8 and the shaft, thereby protecting the magnet from too large mechanical load. To this end the sleeve can be slightly conical near the spring element such that the inner bore diameter of the unbent spring elements is smaller than the inner diameter of the sleeve 3 inside the magnets.

In accordance with embodiments, a larger number of slits 9 can be provided and distributed around the upper end of the sleeve (e.g. 4 to 10 slits) so that the entire upper part of the sleeve 3 consists entirely of spring elements. FIG. 20B shows an example in which multiple axial extending slits are distributed around the circumference of the upper part of the sleeve 3. The spring elements 8 are conically arranged such that respective upper ends of the spring elements 8 are bended towards the axis of rotation. For better view, the left hand side of FIG. 20B shows an exploded view of the magnet portions 1 and 2 and sleeve 6 before mounting the magnet portions 1 and 2 on the sleeve 6. The right hand side of FIG. 20B shows the magnet portions 1 and 2 and sleeve 6 after mounting. In the embodiment of FIG. 20B, the sleeve 6 includes also an additional aligning structure 10. In FIG. 20B, the aligning structure 10 has the shape of an open oblong hole extending in axial direction to the lower end of the sleeve 6. For providing alignment, the shaft 3 may have a structure corresponding to the aligning structure 10. During mounting a stud, a bolt, or a screw (if the shaft 3 has a thread) can then be used to fix the sleeve 6 on the shaft 3.

Figure 20C:
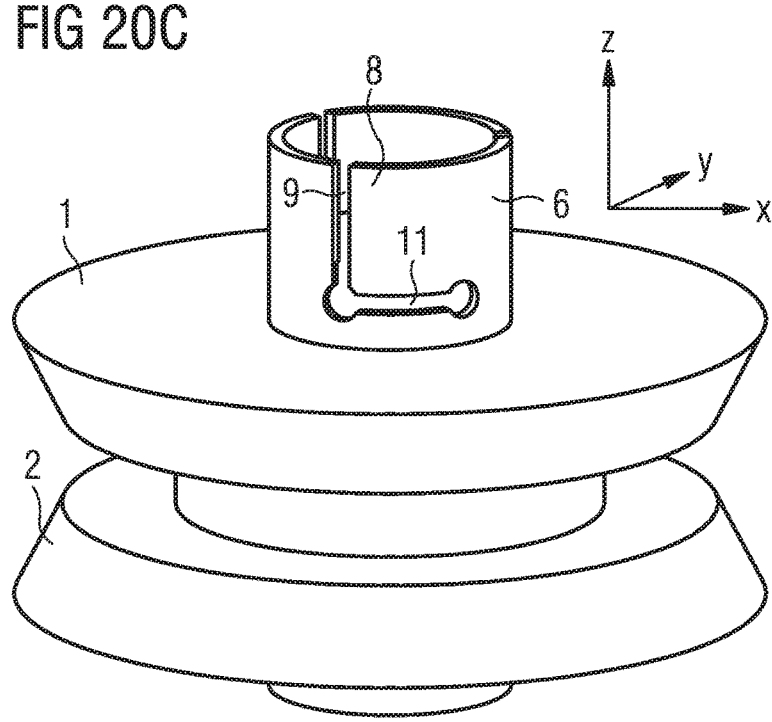

FIG. 20C shows a further modification of the embodiment of FIG. 20A. In addition to the axial extending slits 9, FIG. 20C shows further radial extending slits 11 provided in the sleeve 6. With the axial extending slit 9 and the radial extending slits 11, three spring elements 8 are formed which are regularly distributed around the circumference of the sleeve 6 with adjacent spring elements 8 being offset by 120°.

Furthermore, in FIG. 20C, the magnet assembly is formed with the first and second portions 1 and 2 abutting each other Similar to FIG. 5 (but without the soft magnetic portions 4 and 5 and with a different shape of the magnet portions 1 and 2), the recess between the first and second magnetic portions 1 and 2 extends therefore only partially towards the axis of rotation. The recess ends in radial direction in the region around the interface at which the first and second portions 1 and 2 are abutting each other.

Figure 20D:
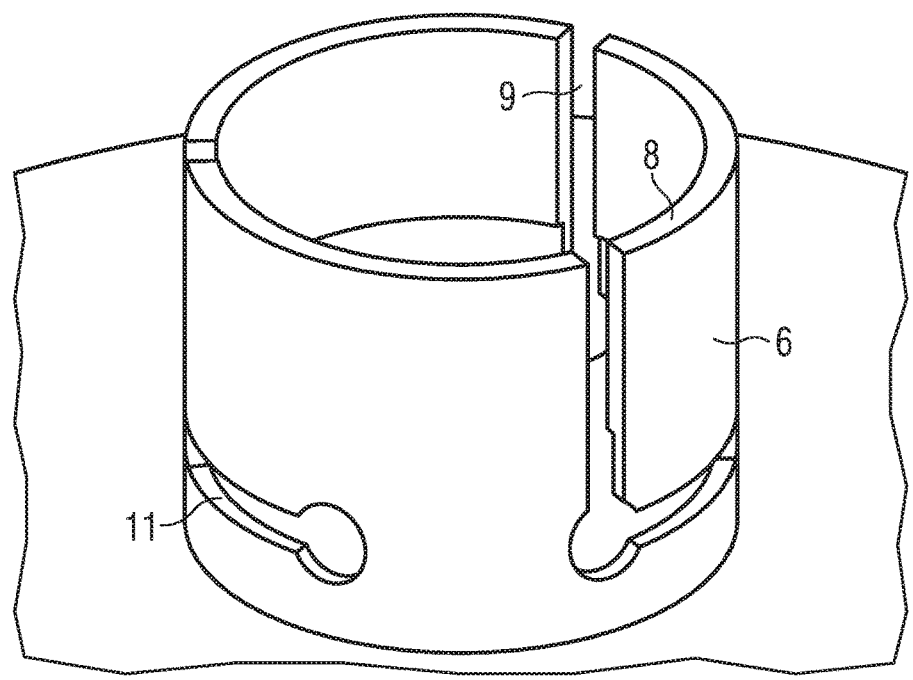

FIG. 20D shows an enlarged perspective view of the upper part of the sleeve 6 from a different perspective. As can be seen from FIG. 20D, a respective upper part of the spring elements 8 is provided with a thicker wall than the lower part. In FIG. 20D, a terrace shape can be seen which is formed at the border between the part having a thicker wall and the part having a thinner wall. The thicker wall of the spring elements 8 provides for the inner surface of the sleeve 6 a radius smaller than a radius of the shaft on which the sleeve is to be mounted. A good pressing of the spring elements 8 on the shaft 3 can be achieved thereby.

Depending on the implementation, the magnet assembly should be tightly fitted in the mounting position over a high temperature range and during vibrations and high rotating frequencies. Since magnetic materials tend to be brittle, excessive mechanical forces acting on the magnetic materials should be avoided. The above described spring element enables to provide a tight fit of the sleeve to the shaft and avoids that excessive mechanical forces are acting to the magnetic material. For example, when the material of the shaft has a different temperature coefficient of expansion than the magnetic material, the spring element is capable to absorb mechanical forces due to extensions caused by temperature changes and therefore avoids damages to the magnetic portions 1 and 2. The spring element 8 shown in FIG. 20 is of the flat spring type. However, many different types, shapes, sizes and positions can be used for the spring element 8.

Furthermore, it is to be noted that FIGS. 20A, 20B and 20C show the first and second magnet portions 1 and 2 having different shapes. FIGS. 20A and 20C show a trapezoid shape and FIG. 20B shows a reversed trapezoid shape (upside down of the trapezoid shape of FIG. 20A). Furthermore, FIG. 20B shows an ellipsoid-shaped recess at the inner side of each magnet portion 1 and 2. However it is to be understood that the shape and the magnetization pattern can be freely chosen in accordance with considerations described with respect to the above embodiments.

Figure 21:
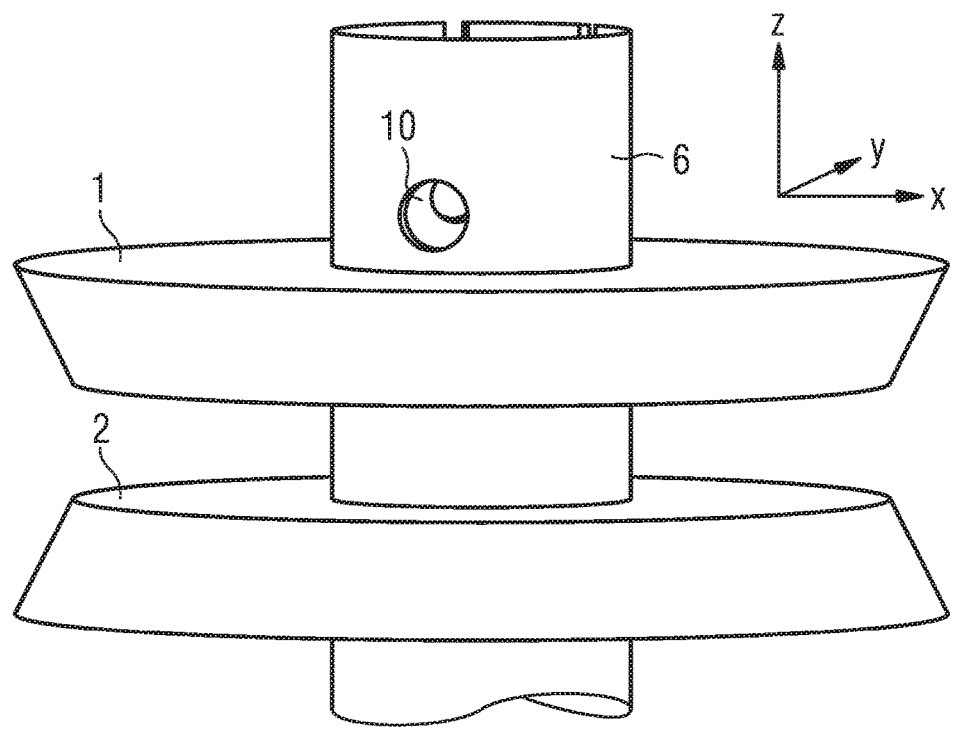
FIG. 21 shows a perspective view according to an embodiment.

FIG. 21 shows a further modification of the embodiment of FIGS. 20A-D. In FIG. 21, the sleeve 6 includes a hole as additional aligning structure 10 for aligning the sleeve on the shaft during mounting. FIG. 21 shows the hole to be circular, however other shapes such as an elongated hole, a rectangular hole etc. can be used. For providing alignment, the shaft 3 may have a structure corresponding to the aligning structure 10. During mounting a stud, a bolt, or a screw (if the shaft 3 has a thread) can be used to fix the sleeve 6 on the shaft 3.

In summary, embodiments described herein demonstrate how the DC part along the reading circle of one or two components of the magnetic field can be made to disappear by mirror-antisymmetry with respect to a symmetry plan comprising the rotational axis (z-axis), with the magnetization pattern of the magnet portions of the assembly determining whether one ($B_z=0$) or two components ($B_R=0$ and $B\psi=0$) of the magnetic field can be made to vanish. Several geometries of permanent magnets and optionally additional soft magnetic parts have been described. Some of them had rotationally symmetric geometry, others were not rotationally symmetric. From all these modifications the best angle accuracy of the sensor system is obtained when the non-vanishing magnetic field component on the sensor elements exhibits zero slopes versus radial position. Then the sensor reading is least affected by small placement errors of the sensor element(s) on the reading circle.

This means for the systems with $B_R=0$ and $B\psi=0$ along the reading circle which have the highest degree of symmetry, that the magnet arrangement is chosen such that $dB_z/dR=0$ (a vanishing first order derivative versus radial position of the z-component) or at least that the magnitude of $dB_z/dR$ is minimized while for points on a circle around the axis of rotation a non-vanishing first order derivative versus azimuthal position of the z-component exists. The non-vanishing first order derivative versus azimuthal position provides a varying z-component at respective sensor positions when the magnet assembly rotates around the axis of rotation which allows using the z-component for detecting the angle of rotation. In practical applications, a vanishing first order derivative $dB_z/dR=0$ is achieved when the magnitude of $dB_z/dR$ is much less than the magnitude of $B_z/R$ ($B_z$ divided by R) for example when $|dB_z/dR|$ is less than ten times $|B_z/R|$, with the radial position being denoted by R and R=0 being a position on the rotation axis. Note that due to the symmetry of the magnet arrangement it holds $dB_z/dz=0$ in z=0; so the system is robust against small placement tolerances of the sensor elements along axial (z) direction. The condition $dB_z/dR=0$ is achieved by carefully balancing the shape of the magnet, its magnetization pattern, the exact size and geometry of the recess near z=0, and the sensor location on the reading circle in z=0 (i.e. the reading radius).

In the other systems with $B_z=0$ along the reading circle, best angle accuracy is achieved if $dB\psi/dR=0$ if the sensor detects the azimuthal magnetic field component $B\psi$. If the system detects the radial magnetic field component $B_R$, the best angle accuracy is achieved for $dB_R/dR=0$. Again here it holds $dB\psi/dz=0$ and $dB_R/dz=0$ due to the symmetry of the magnet arrangement. Again, in practical implementations, $dB\psi/dR=0$ is achieved if $|dB\psi/dR|$ is much less (for example by a factor of 10 or more) than $|B\psi/R|$ and $dB_R/dR=0$ is achieved if $|dB_R/dR|$ is much less (for example by a factor of 10 or more) than $|B_R/R|$. For both above described systems, other vanishing derivatives may be considered, for example second or higher order derivatives but they have less influence to robustness compared to the above described vanishing derivatives. The conditions $dB\psi/dR=0$ and $dB_R/dR=0$ are achieved by carefully balancing the shape of the magnet, its magnetization pattern, the exact size and geometry of the recess near z=0, and the sensor location on the reading circle in z=0 (i.e. the reading radius).

Embodiments described herein take into account of the fact that it is easier to magnetize a magnet along its short side than along its long sides. In the embodiments shown the short side is the thickness direction (=z-direction), which is parallel to the rotation axis, whereas the long sides are the diametrical direction orthogonal to the rotation axis (i.e. the x- and y-directions). If a flat ring is magnetized along its thickness this results in a more accurate magnetization, being more uniform and homogeneous, which gives more reproducible magnetic fields with better repeatability and less process spread and this finally leads to smaller angle errors of the proposed angle sensors.

It is to be mentioned that although the described embodiments of an out-of-shaft absolute angle sensor system show two magnet portions, other embodiments of an out-of-shaft absolute angle sensor system may use only one magnet portion to provide the magnetic field to be sensed. It is therefore to be understood that the various geometrical shapes and features and the various magnetizations and features described above in an assembly for one of the two magnet portions can be equally applied to an out-of-shaft absolute angle sensor system utilizing only one magnet portion for absolute angle sensing. Furthermore, the sensor position described above may be equally applied to an out-of-shaft absolute angle sensor system. In other words, an out-of-shaft absolute angle sensor system can utilize only the first magnet portion 1 or only the second magnet portion 2, where the sensor elements are provided radially outside of the shaft and axially offset to the magnet portion. For embodiments providing a varying axial thickness of the magnet portion, the sensor may be placed on the side which provides a varying gap distance between the sensor and the magnet portion when the shaft rotates around the axis of rotation. In some embodiments, the magnet portion may have a side with a planar face and a side with a non-planar face. In such embodiments, the sensor may be placed on the side with the non-planar face.

Similar, other embodiments may utilize a magnetic field generated by three or more magnet portions.

In addition or as alternative to the above described embodiments, the following embodiments are described:

Embodiment 1 is directed to an angle sensor system comprising:
a shaft arranged to be rotatable around an axis of rotation;
a magnet assembly comprising first and second magnet portions mounted on the shaft, for co-rotation with the shaft around the axis of rotation;
at least one sensor situated outside of the shaft in a plane perpendicular to the axis of rotation at a radial distance from the axis of rotation; and
wherein the magnet assembly produces a magnetic field that is, at least along and close to a reading circle, mirror-symmetrical or mirror-antisymmetrical with respect to the plane, wherein the reading circle is a circle within the plane, the reading circle being concentric with the axis of rotation and having a radius equal to the radial distance.

Embodiment 2 is directed to the embodiment 1, wherein the magnet assembly produces a magnetic field such that a maximal variation of a first component of the magnetic field at positions along the reading circle is at least a factor 10 higher than a maximal variation of a second component of the magnetic field at positions along the reading circle, wherein one of the first or the second components is a component in a direction of the axis of rotation and the second component is perpendicular to the first component.

Embodiment 3 is directed to a method of manufacturing an out of axis angle sensor system comprising:
mounting a first magnet portion and a second magnet portion on a sleeve;
mounting the sleeve on a shaft for co-rotation with the shaft around an axis of rotation such that the first and second magnet portions are geometrically arranged to be mirror-symmetrical to a plane oriented perpendicular to the axis of rotation; and
mounting at least one magnetic sensor radial to the shaft in the plane.

Embodiment 4 is directed to a magnet assembly for use in magnetic angle detecting system to determine a rotational angle of a rotatable shaft around an axis of rotation, the magnet assembly, comprising:
a first magnet portion configured to be mounted on the shaft, for co-rotation with the shaft;
a second magnet portion configured to be mounted on the shaft, for co-rotation with the shaft;
a mounting structure to mount the first and second magnet portions on a rotatable shaft; and
wherein the first and second magnet portions are mounted on the mounting structure such that a magnetic field is cooperatively produced, wherein, at least at positions along and close to a circle concentric with the axis of rotation, the produced magnetic field is mirror-symmetrical or mirror-antisymmetrical with respect to a plane oriented perpendicularly to the axis of rotation of the shaft.

Embodiment 5 is directed to embodiment 4, wherein the first magnet portion comprises a first magnetization and the second magnet portion comprises a second magnetization, wherein in at least one plane that comprises the axis of rotation, a projection of the second magnetization into the at least one plane is point symmetrical to a projection into the at least one plane of one of the first magnetization and an inverted first magnetization with respect to a first symmetry point in the at least one plane.

Embodiment 6 is directed to embodiment 5, wherein the first and second magnet portions are configured to be mounted on the shaft separated from each other along the axis of rotation by a recess therebetween, and wherein the at least one magnetic field sensor is situated at least partially within a radial extent of the recess.

Embodiment 7 is directed to embodiment 5 or 6, wherein a sensor is situated at a radial distance that is larger than a radial distance of a central portion of the first and second magnet portions.

Embodiment 8 is directed to embodiment 7, wherein three magnetic field sensors are situated in the plane at locations that are offset from each other by 120° around the shaft.

Embodiment 8 is directed to a magnet assembly for use in determining a rotational angle of a rotatable shaft, comprising:
a first magnet portion configured to be mounted on the shaft, for co-rotation with the shaft around an axis of rotation;
a second magnet portion configured to be mounted on the shaft, for co-rotation with the shaft around the axis of rotation; and
the first and second magnet portions having respective geometrical configurations such that a radial recess is formed between the first and second magnet portions, wherein the first and second magnet portions are geometrically arranged to be mirror-symmetrical with respect to a plane that is oriented perpendicular to the axis of rotation.

Embodiment 9 is directed to embodiment 8, wherein the first magnet portion comprises a first through hole adapted to pass the shaft through the first magnet portion and the second magnet portion comprises a second through hole adapted to pass the shaft through the second magnet portion.

Embodiment 10 is directed to any one of embodiments 8 or 9, wherein the first magnet portion and the second magnet portion are configured to be mounted on a sleeve which at least partially surrounds a circumference of the shaft.

Embodiment 11 is directed to embodiment 10 wherein the sleeve comprises soft-magnetic material.

Embodiment 12 is directed to embodiments 10 or 11 wherein the sleeve comprises structure to align at least one of angular and axial positions of the sleeve with respect to the shaft.

Embodiment 13 is directed to any of the embodiments 8 to 12, wherein wherein the first magnet portion and the second magnet portion are configured to be mounted on the shaft in adjacent contact with each other, thereby forming a unitary structure on the shaft or to be mounted on the shaft with a gap between the first and second magnet portions.

Embodiment 14 is directed to any of the embodiments 8 to 13, wherein the first and second magnet portions produce a magnetic field with a magnetic field component perpendicular to the axis of rotation on points of a circle around the axis of rotation, wherein the magnetic field has at points on a circle one or more of a vanishing first order derivative versus radial position of the magnetic field component perpendicular to the axis of rotation;

a vanishing first order derivative versus axial position of the magnetic field component perpendicular to the axis of rotation;

a vanishing second or higher order derivative versus radial position of the magnetic field component perpendicular to the axis of rotation; and a vanishing second or higher order derivative versus axial position of the magnetic field component perpendicular to the axis of rotation.

Embodiment 15 is directed to any of the embodiments 8 to 14, wherein the first and second magnet portions comprise a magnetization with at least four different magnetization directions along a concentric oval path in a plane oriented to include the axis of rotation, wherein the at least four different magnetization vectors have magnetization directions which are aligned in a clock-wise order or which are aligned in a counter-clockwise order.

Embodiment 16 is directed to a method of manufacturing an out of axis angle sensor system comprising providing a first magnet part and a second magnet part, the first and second magnet parts being separated from each other and mounting the first and second magnet part on a shaft for co-rotation with the shaft around an axis of rotation such that the first and second magnet parts are joint to form a magnet portion which surrounds the shaft, wherein the magnet portion comprises a varying thickness with at least a first position of a local minimum thickness and a second position of a local minimum thickness, the thickness taken in a direction parallel to the axis of rotation.

Embodiment 17 is directed to a method of manufacturing an out of axis angle sensor system comprising mounting a first magnet portion and a second magnet portion on a sleeve; mounting the sleeve on a shaft for co-rotation with the shaft around an axis of rotation such that the first and second magnet portions are geometrically arranged to be mirror-symmetrical to a plane oriented perpendicular to the axis of rotation and mounting at least one magnetic sensor radial to the shaft in the plane.

Although modifications and changes may be suggested by those skilled in the art, it is the intention of the inventor to embody within the patent warranted hereon all changes and modifications as reasonably and properly come within the scope of his contribution to the art.

The invention claimed is:

1. A magnet assembly for use in determining a rotational angle of a rotatable shaft, comprising:
a first magnet portion configured to be mounted on the shaft, for co-rotation with the shaft around an axis of rotation; and
a second magnet portion configured to be mounted on the shaft, for co-rotation with the shaft around the axis of rotation, the first and second magnet portions having respective geometrical configurations such that a radial recess is formed between the first and second magnet portions, wherein the first and the second magnet portions are geometrically arranged to be mirror-symmetrical with respect to a plane that is oriented perpendicular to the axis of rotation.

2. The magnet assembly according to claim 1, wherein the first and second magnet portions have respective magnetizations that, in combination, produce a magnetic field that is mirror-symmetrical or mirror-antisymmetrical with respect to the plane oriented perpendicularly to the axis of rotation.

3. The magnet assembly according to claim 1, wherein, in a first plane, a geometrical shape of the second magnet portion is central-symmetrically to a geometrical shape of the first magnet portion with respect to a point in the first plane, wherein the first plane is oriented to include the axis of rotation.

4. The magnet assembly according to claim 3, wherein, for at least a second plane which is oriented to include the axis of rotation, a geometrical shape of the second magnet portion is not central-symmetrically to a geometrical shape of the first magnet portion with respect to any point in the second plane, wherein the first and second plane are different planes.

5. The magnet assembly according to claim 1 wherein, in a first plane, a geometrical shape of the second magnet portion is mirror symmetric to a geometrical shape of the first magnet portion with respect to a plane oriented perpendicular to the axis of rotation, wherein the first plane is oriented to include the axis of rotation.

6. The magnet assembly according to claim 1, wherein the first and second magnet portions are magnetized and geometrically arranged to produce in combination a magnetic field such that outside of the first and second magnet portions, the magnetic field comprises a first magnetic field vector with a maximal magnitude of a first component of the magnetic field vector in the plane oriented perpendicular to the axis of rotation such that a magnitude of the first component of the first magnetic field vector is at least a factor 10 larger than a magnitude of a second component of the first magnetic field vector, the second component being perpendicular to the first component, wherein one of the first component and the second component is a component in a direction of the axis of rotation.

7. The magnet assembly according to claim 1, wherein the recess surrounds the axis of rotation and wherein a spacing distance of the recess in a direction parallel to the axis of rotation varies.

8. The magnet assembly according to claim 7, wherein the spacing distance of the recess continuously varies when moving along at least one circle co-centric with the axis of rotation.

9. The magnet assembly according to claim 8, wherein the spacing distance when moving along the at least one circle comprises a first local maximum and a second local maximum, the first and second local maxima are located diametrical with respect to the axis of rotation.

10. The magnet assembly according to claim 7, wherein, for at least one of the first and second magnet portions, a thickness taken in a direction parallel to the axis of rotation varies.

11. The magnet assembly according to claim 1, wherein the recess is a gap, wherein the gap extends at least along a plane perpendicular to the axis of rotation.

12. The magnet assembly according to claim 1, wherein, in a first plane that is oriented to include the axis of rotation, a magnetization of the second magnet portion at points in the first plane is, with respect to a first symmetry point in the first plane, central symmetrically to one of the magnetization or an inverted magnetization of the first magnet portion at points in the first plane.

13. The magnet assembly according to claim 1 wherein the first magnet portion and the second magnet portion are configured to be mounted on a sleeve which at least partially surrounds a circumference of the shaft.

14. The magnet assembly according to claim 1, wherein the first magnet portion has a first section below a first plane and a second section above the first plane, wherein the first plane is oriented to include the axis of rotation within the first plane, wherein, with respect to the first plane, a magnetization of the second section is oriented to be mirror-antisymmetrical to a magnetization of the first section.

15. The magnet assembly according to claim 1 wherein the magnet portions are magnetized and geometrically arranged to produce in combination a magnetic field that is parallel to the axis of rotation on all points of a circle in the plane oriented to be perpendicular to the axis of rotation.

16. The magnet assembly according to claim 1 wherein the magnet portions produce a magnetic field that is perpendicular to the axis of rotation on all points of a circle in the plane oriented to be perpendicular to the axis of rotation.

17. The magnet assembly according to claim 1, wherein the first and second magnet portions are magnetized and geometrically arranged to produce in combination a magnetic field with a magnetic field component parallel to the axis of rotation on points of a circle around an axis of rotation, wherein the magnetic field has at points on a circle around an axis of rotation a non-vanishing first order derivative versus azimuthal position of the component parallel to the axis of rotation and a vanishing first order derivative versus radial position of the component parallel to the axis of rotation.

18. A magnet assembly for use in determining a rotational angle of a shaft which is rotatable around a rotation axis, comprising:
a first magnet portion configured to be mounted on the shaft, for co-rotation with the shaft;
a second magnet portion configured to be mounted on the shaft, for co-rotation with the shaft, wherein:
the first magnet portion includes a first magnetic charge distribution and the second magnet portion having a second magnetic charge distribution;
a magnetic surface charge is inhomogeneously distributed along a rotation axis direction; and
when mirrored at a mirror plane perpendicular to the rotation axis, each point in the first magnetic charge distribution has a corresponding point in the second magnetic charge distribution, whereby a magnitude of magnetic charge in corresponding points is identical.

19. The magnet assembly of claim 18 wherein a sign of magnetic charges in the corresponding points is different.

20. The magnet assembly of claim 18 wherein a sign of magnetic charges in the corresponding points is identical.

21. The magnet assembly of claim 18 comprising a second mirror plane that comprises the rotation axis, the second mirror plane splitting the first magnetic charge distribution into a third and a fourth magnetic charge distribution, such that each point in the third magnetic charge distribution has a twin point in the fourth magnetic charge distribution when mirrored at the second mirror plane, with the magnitude of charge in each point in the third magnetic charge distribution and in its twin point being identical and a sign of charge in each point in the third magnetic charge distribution and in its twin point being different.

22. A device for use in an absolute rotational angle sensor system, comprising:
a magnet portion to co-rotate with a shaft around an axis of rotation, the magnet portion comprising a first section being a first half of the magnet portion and a second section being a second half of the magnet portion, the magnet portion having a varying thickness, the thickness taken in a direction parallel to the axis of rotation, wherein:
the magnet portion comprises a minimum thickness at a first position and at a second position,
the first and the second positions are diametrically arranged, and
the first and the second halves interface each other at the first and the second positions to couple the first and the second halves together to form the magnet portion.

23. The device of claim 22, wherein the first section of the magnet portion comprises a first magnetization and the second section of the magnet portion comprises a second magnetization, wherein the first magnetization and the second magnetization have respectively reversed directions for at least one magnetization vector component.

24. The device of claim 23, wherein the at least one magnetization vector component is a component parallel to the axis of rotation.

25. The device of claim 22, wherein the first section has a first magnetic surface charge distribution and the second section has a second surface charge distribution, the first and second surface charge distribution having opposite signs.

26. The device of claim 22, wherein the thickness of the magnet portion continuously increases when moving along a circle co-centric with the axis of rotation from the first position to a first maximum position, and wherein the thickness of the magnet portion continuously decreases when moving along the circle from the first maximum position to the second position, and wherein the thickness of the magnet portion continuously increases when moving along the circle from the second position to a second maximum position and wherein the thickness of the magnet portion continuously decreases when moving along the circle from the second maximum position to the first position.

27. The magnet assembly according to claim 22, further comprising a second soft magnet portion configured to be mounted on the shaft adjacent to the second magnet portion, for co-rotation with the shaft around the axis of rotation.

28. The magnet assembly according to claim 27, wherein the first magnet portion and the second magnet portion are disposed between the soft magnet portion and the second soft magnet portion in a direction parallel to the axis of rotation.

29. The magnet assembly according to claim 27, wherein the soft magnet portion and the second soft magnet portion are disposed between the first magnet portion and the second magnet portion in a direction parallel to the axis of rotation.

30. The magnet assembly according to claim 27, wherein a first portion of the soft magnet portion is parallel to the first magnet portion and a second portion of the soft magnet portion is at an angle with respect to the first magnet portion.

31. The magnet assembly according to claim 1, further comprising a soft magnet portion configured to be mounted on the shaft adjacent to the first magnet portion, for co-rotation with the shaft around the axis of rotation.

32. The magnet assembly according to claim 1, wherein the first magnet portion includes a first through hole extending through the first magnet portion and adapted to pass the shaft therethrough, and the second magnet portion includes a second through hole extending through the second magnet portion and adapted to pass the shaft therethrough.

* * * * *